(12) United States Patent
Sambandan et al.

(10) Patent No.: US 9,376,332 B2
(45) Date of Patent: Jun. 28, 2016

(54) MULTIVALENCE PHOTOCATALYTIC SEMICONDUCTOR ELEMENTS

(71) Applicant: NITTO DENKO CORPORATION, Osaka (JP)

(72) Inventors: Ekambaram Sambandan, Carlsbad, CA (US); Bin Zhang, San Diego, CA (US)

(73) Assignee: NITTO DENKO CORPORATION, Osaka (JP)

( * ) Notice: Subject to any disclaimer, the term of this patent is extended or adjusted under 35 U.S.C. 154(b) by 210 days.

(21) Appl. No.: 13/840,859

(22) Filed: Mar. 15, 2013

(65) Prior Publication Data

US 2014/0271916 A1    Sep. 18, 2014

(51) Int. Cl.

| | | |
|---|---|---|
| H01L 31/00 | (2006.01) | |
| C02F 1/32 | (2006.01) | |
| B01J 27/24 | (2006.01) | |
| B01J 21/06 | (2006.01) | |
| B01J 23/02 | (2006.01) | |
| B01J 23/06 | (2006.01) | |
| B01J 23/14 | (2006.01) | |
| B01J 23/18 | (2006.01) | |
| B01J 23/22 | (2006.01) | |
| B01J 23/28 | (2006.01) | |
| B01J 23/30 | (2006.01) | |
| B01J 23/755 | (2006.01) | |
| B01J 35/00 | (2006.01) | |
| C02F 101/16 | (2006.01) | |
| C02F 101/30 | (2006.01) | |
| C02F 101/32 | (2006.01) | |

(52) U.S. Cl.
CPC ............... *C02F 1/32* (2013.01); *B01J 21/063* (2013.01); *B01J 23/02* (2013.01); *B01J 23/06* (2013.01); *B01J 23/14* (2013.01); *B01J 23/18* (2013.01); *B01J 23/22* (2013.01); *B01J 23/28* (2013.01); *B01J 23/30* (2013.01); *B01J 23/755* (2013.01); *B01J 27/24* (2013.01); *B01J 35/004* (2013.01); *C02F 2101/16* (2013.01); *C02F 2101/308* (2013.01); *C02F 2101/322* (2013.01); *C02F 2303/04* (2013.01); *C02F 2305/10* (2013.01)

(58) Field of Classification Search
CPC .......... B01J 35/004; B01J 23/00; B01J 27/20; B01J 27/24; B01J 23/14; H01L 31/0264
USPC .................... 252/501.1; 502/174, 1, 350, 352
See application file for complete search history.

(56) References Cited

U.S. PATENT DOCUMENTS

| | | | |
|---|---|---|---|
| 3,701,739 A | 10/1972 | Bovarnick et al. | |
| 6,306,361 B1 | 10/2001 | Shin et al. | |
| 7,544,631 B2 | 6/2009 | Choi et al. | |
| 7,795,173 B2 | 9/2010 | Vanderspurt et al. | |
| 8,178,071 B2 * | 5/2012 | Mizuno et al. ............. | 423/593.1 |
| 2003/0234400 A1 * | 12/2003 | Udagawa ........................ | 257/80 |
| 2005/0230752 A1 * | 10/2005 | Kanno et al. ................... | 257/347 |
| 2007/0131976 A1 * | 6/2007 | Kanno et al. ................... | 257/223 |
| 2007/0154561 A1 | 7/2007 | Takeda et al. | |
| 2008/0150422 A1 * | 6/2008 | Ohara ........................... | 313/504 |
| 2009/0269269 A1 | 10/2009 | White et al. | |
| 2010/0243044 A1 * | 9/2010 | Chang et al. ................... | 136/256 |
| 2011/0082026 A1 | 4/2011 | Sakatani et al. | |
| 2012/0070763 A1 | 3/2012 | Monden et al. | |
| 2012/0083407 A1 | 4/2012 | Shishikura | |
| 2012/0201714 A1 | 8/2012 | Hashimoto et al. | |
| 2012/0227663 A1 * | 9/2012 | Jha et al. ........................ | 117/105 |
| 2013/0180932 A1 | 7/2013 | Fukumura et al. | |
| 2013/0192976 A1 | 8/2013 | Sambandan | |
| 2015/0343434 A1 * | 12/2015 | Sambandan et al. ... | B01J 35/004 502/171 |

FOREIGN PATENT DOCUMENTS

| | | |
|---|---|---|
| CN | 101259422 | 9/2008 |
| CN | 101703948 | 5/2010 |
| DE | 102 33 193 | 2/2003 |
| DE | 10233193 | 2/2003 |
| WO | 2008/009919 | 1/2008 |
| WO | WO 2008/009919 | 1/2008 |
| WO | 2013/116002 | 8/2013 |

OTHER PUBLICATIONS

International Search Report mailed on Aug. 8, 2014 for International Application PCT/US2014/026580 filed on Mar. 13, 2014.
Cao et al., "Improved Photocatalytic Activity of Sn4+ doped TiO2 Nanoparticulate Films Prepared by Plasma-Enhanced Chemical Vapor Deposition", New Journal of Chemistry, 2004, vol. 28, pp. 218-222.
Dorf Ketal Tyzor®: Organic Titanates and Zirconates, "Surface Modifiers for Improved Properties and metal Oxide Formation", printed May 13, 2011 in 3 pages.
International Search Report and Written Opinion in PCT/US2013/021480, dated Jul. 2, 2013.
Nagaveni et al.,"Structure and Photocatalytic Activity of Ti1-xMxO2±δ (M=W, V, Ce, Zr, Fe, and Cu) Synthesized by Solution Combustion Method", Journal of Physical Chemistry, Nov. 2004, vol. 108, No. 52, pp. 20204-02012.
Qiu et al., "Hybrid CuxO/TiO2 Nanocomposites as Risk-Reduction Materials in Indoor Environments", ACS Nano, 6(2):1609-1618 (2012).

(Continued)

*Primary Examiner* — Douglas McGinty
(74) *Attorney, Agent, or Firm* — K&L Gates LLP; Brent A. Johnson; Louis C. Cullman

(57) ABSTRACT

Described herein are elements comprising a p-type semiconductor comprising mixed valence oxide compounds and an n-type semiconductor having a deeper valence band than the p-type semiconductor valence bands wherein the semiconductor types are in ionic communication with each other. The elements enhance photocatalytic activity.

39 Claims, 11 Drawing Sheets

(56) References Cited

OTHER PUBLICATIONS

Zaleska, A., "Doped-TiO2: A Review", Recent Patents on Engineering, 2008, vol. 2, pp. 157-164.

Cheng et al., "Effect of Preparation Conditions on Visible Photocatalytic Activity of Titania Synthesized by Solution Combustion Method," Chinese Journal of Chemical Engineering, 2007, vol. 15, No. 2, pp. 178-183.

Nagaveni et al., "Structure and Photocatalytic Activity of Ti1-xMxO2±5 (M=W, V, Ce, Zr, Fe, and Cu) Synthesized by Solution Combustion Method," Journal of Physical Chemistry, Nov. 2004, vol. 108, No. 52, pp. 20204-20212.

International Search Report and Written Opinion in PCT Application No. PCT/US2013/021480 dated Jul. 2, 2013.

Qui et al., Hybrid $Cu_xO/TiO_2$ Nanocomposites as Risk-Reduction Materials in Indoor Environments, ACS Nano vol. 6, No. 2, pp. 1609-1618, 2012.

Cao et al., "Improved Photocatalytic Activity of Sn4+ doped $TiO_2$ Nanoparticulate Films Prepared by Plasma-Enhanced Chemical Vapor Deposition", New Journal of Chemistry, 2004, vol. 28, pp. 218-222.

Dorf KetaiTyzor®: Organic Titanates and Zirconates, "Surface Modifiers for Improved Properties and Metal Oxide Formation", first accessed May 13, 2011 in 3 pages, accessed for download and submission Apr. 10, 2015 (http://www.dorfketal.com/including/PDF%20Files/K17590_tyzor_surface_modifier_final.pdf).

Wang et al., "Improved Visible Light Photocatalytic Activity of Titania Doped With Tin and Nitrogen", Journal of Materials Chemistry, 2011, vol. 21, pp. 144-150.

Xie et al., "In Situ Controllable Loading of Ultrafine Noble Metal Particles on Titania", Journal of American Chemical Society, 2009, vol. 131, pp. 6648-6649.

Zaleska, Adriana, "Doped-Ti02: A Review", Recent Patents on Engineering, 2008, vol. 2, pp. 157-164.

* cited by examiner ically active over time). Photocatalytic materials are useful for
MULTIVALENCE PHOTOCATALYTIC SEMICONDUCTOR ELEMENTS

FIELD OF THE DISCLOSURE

The current disclosure describes elements having at least one p-type semiconductor comprising mixed valence oxide compounds and at least one n-type semiconductor having a deeper valence band than that of the p-type semiconductor, the n-type semiconductor in ionic charge communication with the mixed valence oxide compounds of the p-type semiconductor. These multivalence elements can be used to enhance the photocatalytic activity of photocatalytic materials.

BACKGROUND OF THE DISCLOSURE

Visible light activated photocatalysts can be deployed for self-cleaning, air and water purification and many other interesting applications usually without any post-deployment non-renewable energy costs. This is because the photocatalysts are able to decompose pollutants (like dyes, volatile organic compounds and $NO_x$) using light available in the ambient like solar radiation or indoor and outdoor lighting. With the anticipated rapid adoption of UV-free indoor lighting (like LEDs and OLEDs), it is imperative to find ways to deploy visible-light activated photocatalysts in indoor applications for instance in cleaning room air in domestic, public and commercial spaces especially in confined areas like aircraft, public buildings, etc. Moreover, additional applications for antibacterial surfaces and self-cleaning materials can have wide applicability in the food service, transportation, health care and hospitality sectors.

Elemental copper, copper composites, alone or in combination with metal oxides, have been described as useful photocatalytic/antibacterial/antiviral materials. See United States Patent Publication Nos. 2007/0154561, 2009/0269269, 2011/0082026, 2012/0201714; and Qiu, Xiaoqing, et al, Hybrid CuXO/TiO2 Nanocomposites as risk-reduction materials in indoor environments. ACS Nano, 6(2):1609-1618 (2012). Elemental copper however, shows a [adjective] degradation of antibacterial activity over time (durability) and unappealing cosmetic appearance change (from Cu metal to black CuO) both believed due to oxidation of elemental copper under normal application conditions. Thus there is a need for improved longevity of anti-bacterial activity over time. Thus there is a need for photocatalytic materials that provide antibacterial/antiviral activity without unappealing cosmetic appearance changes.

SUMMARY OF THE DISCLOSURE

The current disclosure describes elements having at least one p-type semiconductor comprising mixed valence oxide compounds and at least one n-type semiconductor having a deeper valence band than that of the p-type semiconductor wherein the semiconductors are in ionic charge communication with each other. These multivalence elements can be used to enhance the photocatalytic activity of photocatalytic materials and to improve durability (i.e. maintain photocatalytic activity over time). Photocatalytic materials are useful for having and/or enhancing anti-bacterial (light and dark) activity, anti-viral activity, decomposition of volatile organic compounds (VOC) and/or dye discoloration in aqueous solutions.

One particular embodiment includes an element comprising: at least one p-type semiconductor comprising mixed valence oxide compounds, the compound having p-type conduction bands and p-type valence bands; and at least one n-type semiconductor having a deeper valence band than the p-type semiconductor valence bands, the n-type semiconductor in ionic charge communication with the mixed valence oxide compounds.

Another embodiment further comprises a noble metal in ionic charge communication with the mixed valence oxide compounds. In another embodiment, the noble metal is selected from rhodium, ruthium, palladium, silver, osmium, platinum and gold. In another embodiment the noble metal is loaded onto the at least one n-type semiconductor.

In another embodiment, the mixed valence oxide compounds comprise pairs selected from copper(I) and copper (II); cobalt (II) and cobalt (III); Mn(II) and Mn(III); Fe(II) and Fe(III) and Ir(III) and Ir(IV).

In another embodiment, the at least one p-type semiconductor is loaded onto the at least one n-type semiconductor.

In another embodiment, the mixed valence oxide compounds are substantially uniformly dispersed onto the at least one n-type semiconductor. In another embodiment, the mixed valence oxide compounds have a particle size of 100 nm or less.

In another embodiment, the copper(I) and copper (II) compound is a $Cu_xO$ compound. In another embodiment, the CuxO compound is chemically valence controlled. In another embodiment, the ratio of copper(I) and copper (II) is between 10:90 to 90:10.

In another embodiment, the p-type semiconductor is 0.001 to 10 wt % of the element and the p-type semiconductor is 90 to 99.999 wt % of the element.

In another embodiment, the at least one n-type semiconductor is an oxide comprising an element selected from cerium, tungsten, tantalum, tin, zinc, strontium, zirconium, barium, indium or aluminum oxide. In another embodiment, the at least one n-type semiconductor is selected from Sn—Ti $(O,C,N)_2$, $CeO_2$, $KTaO_3$, $Ta_2O_5$, $SnO_2$, $WO_3$, $ZnO$, $SrTiO_3$, $BaTiO_3$, $ZrTiO_4$, $In_2TiO_5$, $Al_2TiO_5$, or $LiCa_2Zn_2V_3O_{12}$. In another embodiment, the at least one n-type semiconductor is $A_{2-x}In_xTiO_5$ wherein $0<x<2$. In another embodiment, the at least one n-type semiconductor is $Zr_{1-y}Ce_yTiO_4$ wherein $0<y<1$.

In another embodiment, the at least one n-type semiconductor is a titanium oxide having a valence band controlled through doping. In another embodiment, the at least one n-type semiconductor is a titanium oxide doped with a compound selected from N, C or both. In another embodiment, the at least one n-type semiconductor is a titanium oxide comprising a compound represented by the formula $(Ti_{1-r}M_r)(O_{2-s-t}C_sN_t)$, wherein: M is selected from the group consisting of Sn, Ni, Sr, Ba, Fe, Bi, V, Mo, W, Zn, Cu, and combinations thereof; r is in the range of 0 to 0.25; s is in the range of 0.001 to 0.1; and t is in the range of 0.001 to 0.1.

Another embodiment comprises a photocatalyst selected from $(Ti_{0.99}Sn_{0.01})(O_{2-s-t}C_sN_t)$, $(Ti_{0.97}Sn_{0.03})(O_{2-s-t}C_sN_t)$, $(Ti_{0.95}Sn_{0.05})(O_{2-s-t}C_sN_t)$, $(Ti_{0.90}Sn_{0.10})(O_{2-s-t}C_sN_t)$, $(Ti_{0.85}Sn_{0.15})(O_{2-s-t}C_sN_t)$, $(Ti_{0.985}Ni_{0.015})(O_{2-s-t}C_sN_t)$, $(Ti_{0.98}Ni_{0.02})(O_{2-s-t}C_sN_t)$, $(Ti_{0.97}Ni_{0.03})(O_{2-s-t}C_sN_t)$, $(Ti_{0.99}Sr_{0.01})(O_{2-s-t}C_sN_t)$, $(Ti_{0.97}Sr_{0.03})(O_{2-s-t}C_sN_t)$, $(Ti_{0.95}Sr_{0.05})(O_{2-s-t}C_sN_t)$, $(Ti_{0.97}Ba_{0.3})(O_{2-s-t}C_sN_t)$, $(Ti_{0.95}Ba_{0.05})(O_{2-s-t}C_sN_t)$, $(Ti_{0.94}Sn_{0.05}Fe_{0.01})(O_{2-s-t}C_sN_t)$, $(Ti_{0.94}Sn_{0.05}Ni_{0.01})(O_{2-s-t}C_sN_t)$, $(Ti_{0.99}Fe_{0.01})(O_{2-s-t}C_sN_t)$, $(Ti_{0.95}Zn_{0.05})(O_{2-s-t}C_sN_t)$, $(Ti_{0.77}Sn_{0.15}Cu_{0.08}Cu)(O_{2-s-t}C_sN_t)$, $(Ti_{0.85}Zn_{0.15})(O_{2-s-t}C_sN_t)$, $(Ti_{0.90}Bi_{0.10})(O_{2-s-t}C_sN_t)$, $(Ti_{0.996}V_{0.004})(O_{2-s-t}C_sN_t)$, $(Ti_{0.984}V_{0.016})(O_{2-s-t}C_sN_t)$, $(Ti_{0.970}V_{0.03})(O_{2-s-t}C_sN_t)$, $(Ti_{0.997}Mo_{0.003})(O_{2-s-t}C_sN_t)$, $(Ti_{0.984}Mo_{0.016})(O_{2-s-t}C_sN_t)$, $(Ti_{0.957}Mo_{0.043})(O_{2-s-t}C_sN_t)$, $(Ti_{0.97}W_{0.03})(O_{2-s-t}C_sN_t)$, $(Ti_{0.95}W_{0.05})(O_{2-s-t}C_sN_t)$, $(Ti_{0.996}V_{0.004})(O_{2-s-t}C_sN_t)$, $(Ti_{0.984}V_{0.016})(O_{2-s-t}C_sN_t)$ and $(Ti_{0.970}V_{0.03})(O_{2-s-t}C_sN_t)$.

A particular embodiment of making an element described herein includes methods for loading a mixed valence compound. This method can include adding a dispersing agent to a mixed valence-type compound to more positively charge the surface of the n-type compound; adding an attracting agent to the n-type compounds to make the surface charge of the n-type semiconductor more negative; and mixing the dissimilarly charged materials with each other at a temperature below the doping temperature of the mixed valence compound.

DETAILED DESCRIPTION

The current disclosure describes elements having at least one p-type semiconductor comprising mixed valence oxide compounds and at least one n-type semiconductor having a deeper valence band than that of the p-type semiconductor, the n-type semiconductor in ionic charge communication with the mixed valence oxide compounds of the p-type semiconductor. These multivalence elements can be used to enhance the photocatalytic activity of photocatalytic materials and to improve durability (i.e. maintain photocatalytic activity over time). Photocatalytic materials are useful for having and/or enhancing anti-bacterial (light and dark) activity, anti-viral activity, decomposition of volatile organic compounds (VOC) and/or dye discoloration in aqueous solutions.

Figure 1C:
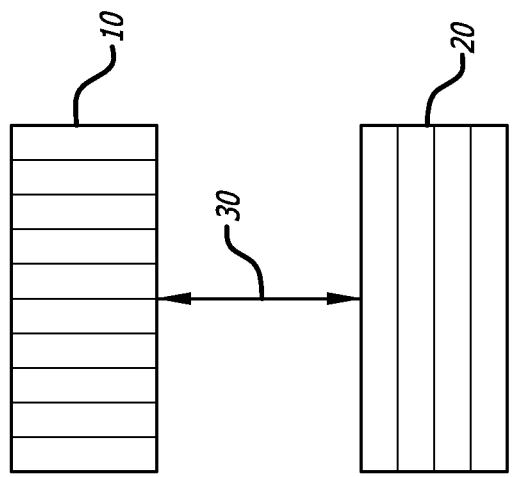
FIG. 1C is a schematic showing the relationship between conduction energy bands with valence energy bands for non-conducting materials.
Figure 1B:
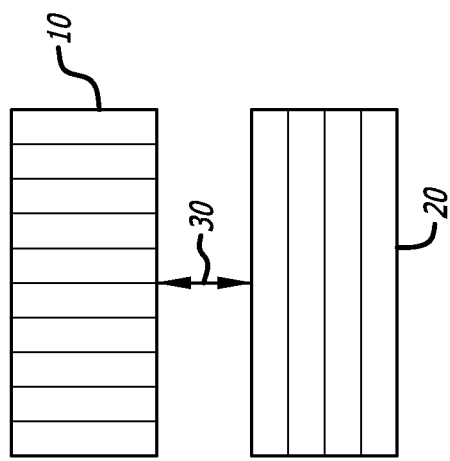
FIG. 1B is a schematic showing the relationship between conduction energy bands with valence energy bands for semiconductor materials.
Figure 1A:
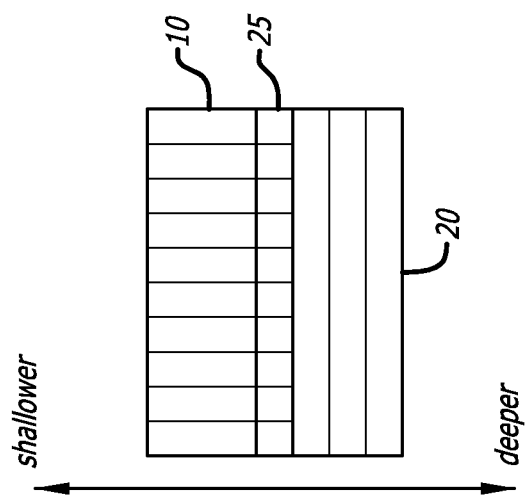
FIG. 1A is a schematic showing the relationship between conduction energy bands with valence energy bands for metal materials.

As shown in FIG. 1, a conduction band 10 is a range of electron energies enough to free an electron from binding with its atom to move freely within the atomic lattice of the material as a 'delocalized electron'. In semiconductors, the valence band 20 is the highest range of electron energies in which electrons are normally present at absolute zero temperature. The valence electrons are substantially bound to individual atoms, as opposed to conduction electrons (found in semiconductors), which can move more freely within the atomic lattice of the material. On a graph of the electronic band structure of a material, the valence band 20 is generally located below the conduction band, separated from it in insulators and semiconductors by a band gap 30. In some materials, the conduction band has substantially no discernible energy gap separating it from the valence band. The conduction and valence bands may actually overlap (overlap 25), for example, when the valence band level energy is higher or less negative than the conduction band level energy.

Various materials may be classified by their band gap, e.g., classified by the difference between the valence band 20 and conduction band 10. In non-conductors, e.g., insulators, the conduction band is much higher than that of the valence band, so it takes much too much energy to displace the valence electrons. These insulators are said to have a non-zero band gap. In conductors, such as metals, that have many free electrons under normal circumstances, the conduction band 10 overlaps 25 with the valence band 20—there is no band gap, so it takes very little or no additional applied energy, to displace the valence electrons. In semiconductors, the band gap is small, on the order of 200 nm to 1000 nm. While not wanting to be bound by theory, it is believed this explains why it takes a relatively little energy (in the form of heat or light) to make semiconductors' electrons move from the valence band to another energy level and conduct electricity, hence the name, semiconductor.

Figure 2:
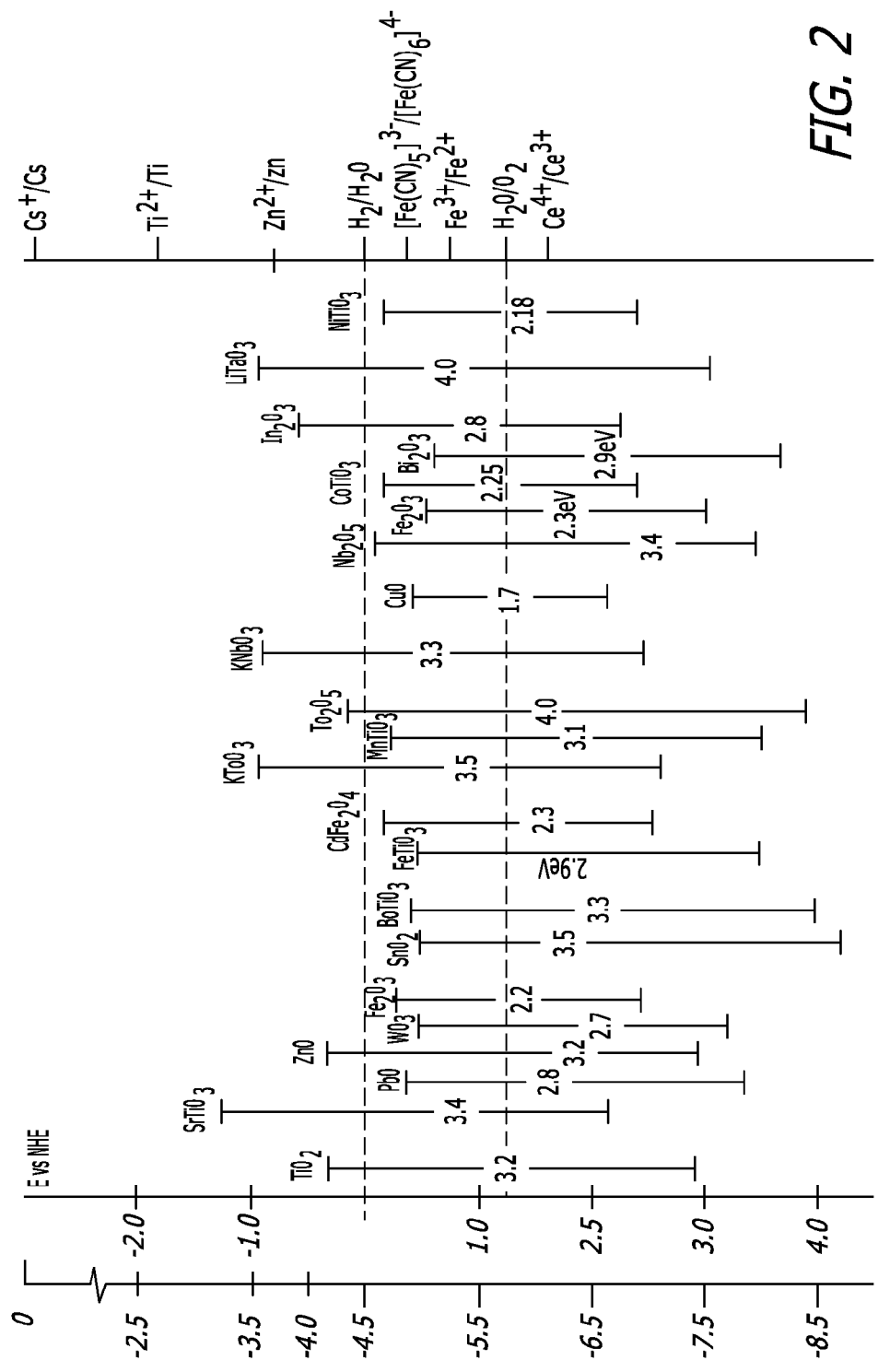
FIG. 2 is a schematic showing the conduction and valence energy band levels for various compounds described herein.

In some embodiments, an element is provided that comprises at least one p-type semiconductor comprising mixed valence oxide compounds, the compound having p-type conduction bands and p-type valence bands; and at least one separate n-type semiconductor having a deeper or more negative valence band than that of the p-type semiconductor pair valence bands, the n-type semiconductor in ionic charge communication with the mixed valence oxide compounds. Examples of suitable conduction bands and valence bands are shown in FIG. 2. While not wanting to be bound by theory, if the valence band of the n-type semiconductor is deeper or more negative than the valence band of the p-type, electrons are more easily able to pass from the n-type to the p-type compound. If the materials are in ionic communication, electrons can pass from one compound to the next, enabling regeneration of the higher valence compound to the lower valence compound. For example, $Cu^{2+}$ can be recycled to $Cu^{1+}$ via this mechanism. In some embodiments, the materials in ionic communication are loaded onto one another. By loading, the materials retain their separate identity, e.g., $Cu_xO$ separate from $TiO_2$. In particular embodiments, one material is on the surface or in close proximity to the other, as opposed to doping. In other embodiments, the elements are integrated within a compound matrix, e.g., incorporated into the compound/crystal lattice.

In some embodiments, an element is provided that comprises at least one p-type semiconductor comprising mixed valence oxide compounds, the compound having p-type conduction bands and p-type valence bands. In particular embodiments, the mixed valence oxide compounds comprise at least one mixed valence pair selected from a copper(I) and copper(II); cobalt (II) and cobalt (III); Mn(I) and Mn(III); Fe(II) and Fe(III); and Ir(III) and Ir(IV) and combinations thereof. In particular embodiments, copper (I) and copper (II) compounds can be $Cu_xO$ compounds. In particular embodiments, the mixed valence oxide compounds can include $Cu^{1+}$ and $Cu^{2+}$. Ratios of mixed valence oxide compounds can be 10% to 90% to 90% to 10%. Particular ratios can also include: 15% to 85%; 20% to 80%; 25% to 75%; 30% to 70%; 35% to 65%; 40% to 60%; 45% to 55%; 50% to 50%; 55% to 45%; 60% to 40%; 65% to 35%; 70% to 30%; 75% to 25%; 80% to 20%; and 85% to 15%.

In a particular embodiment, the mixed valence compounds are $Cu^+:Cu^{2+}$ at a ratio between 10% to 90% $Cu^{1+}$:90% to 10% $Cu^{2+}$. The ratio of $Cu^{1+}:Cu^{2+}$ can also be 15% to 85%; 20% to 80%; 25% to 75%; 30% to 70%; 35% to 65%; 40% to 60%; 45% to 55%; 50% to 50%; 55% to 45%; 60% to 40%; 65% to 35%; 70% to 30%; 75% to 25%; 80% to 20%; and 85% to 15%.

In some embodiments, a p-type semiconductor is loaded onto the at least one n-type semiconductor. In some embodiments, the p-type semiconductor mixed valence compounds are substantially uniformly dispersed onto the at least one n-type semiconductor. The particle size of the mixed valence compounds can be less than 200 nm; less than 190 nm; less than 180 nm; less than 170 nm; less than 160 nm; less than 150 nm; less than 140 nm; less than 130 nm; less than 120 nm; less than 110 nm; less than 100 nm; less than 90 nm; less than 80 nm; less than 70 nm; less than 60 nm; less than 50 nm; less than 40 nm; less than 30 nm; less than 20 nm; or less than 10 nm. In a particular embodiment, the particle size of the mixed valence compounds is 100 nm or less.

In some embodiments, the p-type comprises from 0.001 to 10 wt % of the element and the n-type comprises from 99.999 to 90 wt % of the element. In additional embodiments, the p-type comprises 0.001 wt % of the element; 0.005 wt % of the element; 0.01 wt % of the element; 0.05 wt % of the element; 0.1 wt % of the element; 0.5 wt % of the element; 1.0 wt % of the element; 2.0 wt % of the element; 3.0 wt % of the element; 4.0 wt % of the element; 5.0 wt % of the element; 6.0 wt % of the element; 7.0 wt % of the element; 8.0 wt % of the element; 9.0 wt % of the element; or 10.0 wt % of the element. In additional embodiments, the n-type comprises 90 wt % of the element; 91 wt % of the element; 92 wt % of the element; 93 wt % of the element; 94 wt % of the element; 95 wt % of the element; 96 wt % of the element; 97 wt % of the element; 98 wt % of the element; 99 wt % of the element; 99.1 wt % of the element; 99.2 wt % of the element; 99.3 wt % of the element; 99.4 wt % of the element; 99.5 wt % of the element; 99.6 wt % of the element; 99.7 wt % of the element; 99.8 wt % of the element; or 99.5 wt % of the element.

In some embodiments, the at least one p-type semiconductor is loaded onto the at least one n-type semiconductor. In some embodiments, the n-type semiconductor is an oxide comprising an element that can be selected from cerium, tungsten, tantalum, tin, zinc or strontium oxide having a valence band deeper than that of the p-type semiconductor pair valence bands. In some embodiments, the n-type semiconductor can be ananatase, rutile, wurtzite, spinel, perovskite, pyrochlore, garnet, zircon and/or tialite phase material or mixtures thereof. Each of these options is given its ordinary meaning as understood by one having ordinary skill in the semiconductor art. Comparison of an x-ray diffraction pattern of a given standard and the produced sample is one of a number of methods that may be used to determine whether the sample comprises a particular phase. Exemplary standards include those XRD spectra provided by the National Institute of Standards and Technology (NIST) (Gaithersburg, Md., USA) and/or the International Centre for Diffraction Data (ICDD, formerly the Joint Committee on Powder Diffraction Standards [JCPDS]) (Newtown Square, Pa., USA).

In additional embodiments, the n-type semiconductor can be selected from cerium, tungsten, tantalum, tin, zinc, strontium, zirconium, barium, indium and aluminum oxide. The n-type semiconductor can also be selected from $CeO_2$, $KTaO_3$, $Ta_2O_5$, $SnO_2$, $WO_3$, $ZnO$, $SrTiO_3$, $TiO_2$, $SnO_2$, $BaTiO_3$, $FeTiO_3$, $CdFe_2O_4$, $MnTiO_3$, $KNbO_3$, $Nb_2O_5$, $CuTiO_3$, $BiO_3$, $In_2O_3$, $LiTaO_3$, $NiTiO_3$, $In_2TiO_5$, $Al_2TiO_5$, $Al_{2-x}In_xTiO_5$, $ZrTiO_4$, $Zr_{1-y}Ce_yTiO_4$ and $LiCa_2Zn_2V_3O_{12}$. In particular embodiments, the n-type semiconductor comprises a compound represented by the formula $Al_{2-x}In_xTiO_5$, wherein, x is in the range of 0 to 2 (0<x<2). In other particular embodiments, the n-type semiconductor comprises a compound represented by the formula $Zr_{1-y}Ce_yTiO_4$, wherein y is in the range of 0 to 1 (0<y<1). In particular embodiments, the n-type semiconductor is a titanium oxide having a valence band controlled through doping. In some embodiments, the n-type semiconductor is a titanium oxide doped with a compound selected from N or C or both. In some embodiments, the titanium oxide comprises a compound represented by the formula $(Ti_{1-r}M_r)(O_{2-s-t}C_sN_t)$, wherein, M is selected from the group consisting of Sn, Ni, Sr, Ba, Fe, Bi, V, Mo, W, Zn, Cu or combinations thereof; r is in the range of 0 to 0.25; s is in the range of 0.001 to 0.1; and t is in the range of 0.001 to 0.1. In some embodiments, r is no more than 0.20. r can more particularly be 0; 0.01; 0.02; 0.03; 0.04; 0.05; 0.06; 0.07; 0.08; 0.09; 0.10; 0.11; 0.12; 0.13; 0.14; 0.15; 0.16; 0.17; 0.18; 0.19; 0.20; 0.21; 0.22; 0.23; 0.24; or 0.25. s can more particularly be 0.001; 0.005; 0.01; 0.02; 0.03; 0.04; 0.05; 0.06; 0.07; 0.08; 0.09; or 0.1. t can more particularly be 0.001; 0.005; 0.01; 0.02; 0.03; 0.04; 0.05; 0.06; 0.07; 0.08; 0.09; or 0.1.

The materials are also described in applicants' co-pending and co-assigned application Ser. No. 13/741,191, filed 14 Jan., 2013, which is incorporated by reference in its entirety for its description of photocatalytic compounds and/or compositions. In some embodiments, M is selected from the group consisting of Sn, Ni, Sr, Ba, Fe, Bi, and combinations thereof. In some embodiments, r is in the range of 0.0001 to 0.15. In some embodiments, M is Sn. In some embodiments, r is at least 0.001. In some embodiments, the n-type semiconductor is selected from $(Ti_{0.99}Sn_{0.01})(O_{2-s-t}C_sN_t)$, $(Ti_{0.97}Sn_{0.03})(O_{2-s-t}C_sN_t)$, $(Ti_{0.95}Sn_{0.05})(O_{2-s-t}C_sN_t)$, $(Ti_{0.90}Sn_{0.10})(O_{2-s-t}C_sN_t)$, $(Ti_{0.85}Sn_{0.15})(O_{2-s-t}C_sN_t)$, $(Ti_{0.985}Ni_{0.015})(O_{2-s-t}C_sN_t)$, $(Ti_{0.98}Ni_{0.02})(O_{2-s-t}C_sN_t)$, $(Ti_{0.97}Ni_{0.03})(O_{2-s-t}C_sN_t)$, $(Ti_{0.99}Sr_{0.01})(O_{2-s-t}C_sN_t)$, $(Ti_{0.97}Sr_{0.03})(O_{2-s-t}C_sN_t)$, $(Ti_{0.95}Sr_{0.05})(O_{2-s-t}C_sN_t)$, $(Ti_{0.97}Ba_{0.03})(O_{2-s-t}C_sN_t)$, $(Ti_{0.95}Ba_{0.05})(O_{2-s-t}C_sN_t)$, $(Ti_{0.94}Sn_{0.05}Fe_{0.01})(O_{2-s-t}C_sN_t)$, $(Ti_{0.94}Sn_{0.05}Ni_{0.01})(O_{2-s-t}C_sN_t)$, $(Ti_{0.99}Fe_{0.01})(O_{2-s-t}C_sN_t)$, $(Ti_{0.95}Zn_{0.05})(O_{2-s-t}C_sN_t)$, $(Ti_{0.77}Sn_{0.15}Cu_{0.08})(O_{2-s-t}C_sN_t)$, $(Ti_{0.85}Zn_{0.15})(O_{2-s-t}C_sN_t)$, $(Ti_{0.90}Bi_{0.10})(O_{2-s-t}C_sN_t)$, $(Ti_{0.996}V_{0.004})(O_{2-s-t}C_sN_t)$, $(Ti_{0.984}V_{0.016})(O_{2-s-t}C_sN_t)$, $(Ti_{0.970}V_{0.03})(O_{2-s-t}C_sN_t)$, $(Ti_{0.997}Mo_{0.03})(O_{2-s-t}C_sN_t)$, $(Ti_{0.984}Mo_{0.016})(O_{2-s-t}C_sN_t)$, $(Ti_{0.957}Mo_{0.043})(O_{2-s-t}C_sN_t)$, $(Ti_{0.97}W_{0.03})(O_{2-s-t}C_sN_t)$, and $(Ti_{0.95}W_{0.05})(O_{2-s-t}C_sN_t)$. In some embodiments, the n-type semiconductor is selected from $(Ti_{0.996}V_{0.004})(O_{2-s-t}C_sN_t)$, $(Ti_{0.984}V_{0.016})(O_{2-s-t}C_sN_t)$, and $(Ti_{0.970}V_{0.03})(O_{2-s-t}C_sN_t)$. In some embodiments, one of the n-type semiconductors is loaded by p-type semiconductor and this p-type semiconductor loaded n-type semiconductor can be physically mixed with at least one selected from the other n-type semiconductor. In some embodiments, the n-type semiconductor can be $WO_3$. In some embodiments, the n-type semiconductor physically mixed with p-type loaded on $WO_3$ can be selected from $CeO_2$, $TiO_2$, $SrTiO_3$ and $KTaO_3$. In some embodiments, the n-type semiconductor can be inorganic. In some embodiments, the inorganic n-type semiconductor can be an oxide, such as a metal dioxide, including $CeO_2$, $TiO_2$, or the like. In some embodiments, the n-type semiconductor can be selected from $SiO_2$, $SnO_2$, $Al_2O_3$, $ZrO_2$, $Fe_2O_3$, $Fe_3O_4$, NiO, $Nb_2O_5$, and $CeO_2$.

In some embodiments, the n-type semiconductor can be $Re_kE_mO_n$, wherein Re is a rare earth element, E is an element or a combination of elements, and O is oxygen, and $1 \leq k \leq 2$; $2 \leq m \leq 3$, and $0 \leq n \leq 3$. In some embodiments, the n-type semiconductor can be $Re_pO_q$ where Re can be a rare earth metal and p can be greater than or equal to 1 and less than or equal to 2, or can be between 1 and 2 and q can be greater than or equal to 2 and less than or equal to 3 or can be between 2 and 3. Examples of suitable rare earth elements include scandium, yttrium and the lanthanide and actinide series elements. Lanthanide elements include elements with atomic numbers 57 through 71. Actinide elements include elements with atomic numbers 89 through 103. In some embodiments, the n-type semiconductor can be $Ce_xZr_yO_2$ wherein the y/x ratio=0.001 to 0.999. In some embodiments, the n-type semiconductor can be cerium. In some embodiments, the n-type semiconductor can be $CeO_a$ ($a \leq 2$). In some embodiments, the n-type semiconductor can be cerium oxide ($CeO_2$).

In some embodiments, the n-type semiconductor can be a non-oxide. In some embodiments, the non-oxide can be a carbide and/or nitride. In some embodiments, the carbide can be silicon carbide.

In some embodiments, the mole ratio of physical mixture of the n-type semiconductor (e.g., $CeO_2$) with p-type semiconductor loaded $WO_3$ (e.g., $Cu_xO$—$WO_3$) can be 0-99% n-type semiconductor: and 100%-1% p-type semiconductor ($Cu_xO$ loaded $WO_3$). In some embodiments, the mole ratio of physical mixture of the n-type semiconductor (e.g., $CeO_2$) with p-type semiconductor loaded $WO_3$ can be 25 to 75% (and every integer in between): n-type semiconductor: 75% to 25% (and every integer in between) p-type semiconductor loaded n-type material, e.g., $WO_3$. In some embodiments, the mole ratio of physical mixture of the n-type semiconductor (e.g., $CeO_2$) with p-type semiconductor loaded $WO_3$ can be 40 to 60% (and every integer in between): n-type semiconductor: 60% to 40% (and every integer in between) p-type semiconductor loaded n-type material, e.g., $WO_3$.

In some embodiments, the element can further comprise a noble metal in ionic charge communication with the oxide compound. In some embodiments, the noble metal is loaded onto the at least one n-type semiconductor. In some embodiments, the noble metal can be, without limitation, rhodium, ruthium, palladium, silver, osmium, platinum and or gold or mixtures thereof. In one embodiment, the noble metal is platinum.

In some embodiments a method for loading a mixed valence compound can be adding a dispersing agent to an n-type compound to more positively charge the surface of the n-type compound; adding a p-type precursor to the dispersing agent and n-type compound, wherein the p-type precursor comprises a copper cation complex; adding an attracting agent to the n-type compounds to make the surface charge of the n-type semiconductor more negative; and combining the dissimilarly charged materials with each other at a temperature below the doping temperature of the mixed valence compounds.

In some embodiments, the dispersing agent can be a strong acid. In some embodiments, the dispersing agent can be 4-7M HCl. In some embodiments, the dispersing agent is 6M HCl.

In some methods, a valence control material is added along with the dissimilarly charged materials to control the mixed valence oxides during the synthesis of the mixed valence oxides. In some embodiments, the valence control material is a mild reducing agent. In some embodiments, the valence control material can be at least one of a sugar, a hydrazide, an amino acid, and/or an amide. In some embodiments, the amide can be urea. In some embodiments, the sugar can be sucrose, fructose, and/or glucose. In some embodiments, the sugar is glucose. In some embodiments, the hydrazide can be Carbohydrazide, Oxalyl Dihydrazide, Maleic Hydrazide, Diformyl Hydrazine or Tetraformyl Trisazine. In some embodiments, the amino acid can be at least one of the proteinogenic or natural amino acids. In some embodiments, the amino acid can be an aliphatic amino acid (e.g., glycine, alanine, valine, leucine, and/or isoleucine). In some embodiments, the amino acid can be a hydroxyl or sulfur containing amino acid (e.g., serine, cysteine, threonine and/or methionine). In some embodiments, the amino acid can be cyclic (e.g., proline). In some embodiments, the amino acid can be aromatic (e.g., phenylalanine, tyrosine and/or tryptophan). In some embodiments, the amino acid can be basic (e.g., histidine, lysine, and/or arginine). In some embodiments, the amino acid is acidic or amide (e.g., aspartate, glutamate, asparagines and/or glutamine). In some embodiments the amino acid can be selenocysteine and/or pyrrolysine. In some embodiments the amino acid can be non-proteinogenic. In some embodiments the non-proteinogenic amino acids include those not found in proteins (for example carnitine, GABA). In some embodiments, the non-proteinogenic amino acids can be those in isolation by standard cellular machinery (for example, hydroxyproline and selenomethionine). In some embodiments, the amino acid is soluble in water. In some embodiments the amino acid is soluble in water at 90° C. In some embodiments the amino acid is substantially entirely dissolved in water at 90° C. The term soluble has the ordinary meaning known to a person of ordinary skill in the art.

In some embodiments, the ratio of the mixed valence oxide compounds, e.g., Cu1+ compounds and Cu2+ compounds, can be controlled by a method of loading the Cu onto the p-type semiconductor including adding the attracting agents. In some embodiments, the attracting agents that can control the ratio of mixed valence oxide compounds can include a monosaccharide and a base compound. In some embodiments, the monosaccharide can be glucose. In some embodiments, the glucose can be D-glucose and/or L-glucose. In some embodiments, the glucose to NaOH can be can be 10% to 90% to 90% to 10%. Particular ratios can also include: 15% to 85%; 20% to 80%; 25% to 75%; 30% to 70%; 35% to 65%; 40% to 60%; 45% to 55%; 50% to 50%; 55% to 45%; 60% to 40%; 65% to 35%; 70% to 30%; 75% to 25%; 80% to 20%; and 85% to 15%. In some embodiments, the base can be NaOH. $Cu_xO$ compound is valence controlled chemically.

In some embodiments, the attracting agent can be an agent that provides a sufficient amount of hydroxyl ions to bring the pH of the total solution between pH 8.0 to pH 9.0. In some embodiments, the attracting agent can be a strong base. In some embodiments, the attracting agent is a 4-7 M strong base. In some embodiments, the attracting agent is 6 M NaOH.

In some embodiments, the p-type precursor can be a substantially sodium free compound. In some embodiments, the substantially sodium free compound can be a copper cation complex. In some embodiments, the copper cation complex can be Bis(Ethylenediamine) Copper (II) (BEDCuII), Copper (II) tetra amine chloride, Copper (II) tetra amine sulfate, and/or Copper (II) tetra amine hydroxide and/or mixtures thereof. In some embodiments, the compound can be Bis (Ethylenediamine) Copper (II). The structure of BEDCuII is shown below.

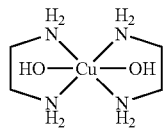

In some embodiments, the doping temperature of the mixed valence compound is between 150° C. to 700° C. In some embodiments, less than the doping temperature of the mixed valence compound is less than 175° C., less than 150° C., less than 125° C. In some embodiments, the mixing temperature is between 75° C. to 125° C. or 80° C.; 85° C.; 95° C.; 100° C.; 105° C.; 110° C.; 115° C.; 120° C.; or 120° C.;

In some embodiments, the precursor selected for the p-type semiconductors can be salts of chloride, acetate, nitrate, sulfate, carbonate, oxide, hydroxide, peroxide or combinations thereof.

In some embodiments the described elements have photocatalytic activity. The elements can be anti-bacterial (light and dark); anti-viral; can decompose volatile organic compounds (VOC); and/or can discolor food additive dyes. The elements described herein can also increase the durability (time of effectiveness) of photocatalytic materials.

Those of ordinary skill in the art recognize ways to determine whether an element is anti-bacterial (light), e.g., after the element is exposed to visible light. In one embodiment, anti-bacterial exposure results in at least a reduction of 10% (90% remains), at least 50% (50% remains), at least 99% (at least 1% remains), at least 99.9% (at least 0.1% remains) or at least 100% (0% remains). One example of determining whether the element is anti-bacterial (light) can be by assessing the amount of bacteria present, e.g., a decrease in the amount of bacteria present, after the element is contacted with the bacteria and exposed to visible light. For example, the amount of bacteria present in the sample after exposing the sample for a predetermined time period can be assessed. In some embodiments, the sample can be exposed for 15 minutes, 30 minutes, 1 hour, 2 hours, 5 hours, 7.5 hours, 10 hours, 12 hours 24 hours. In some embodiments, the sample is exposed to 800 lux from a fluorescent light source or at least 5 mW/cm2 from a blue LED.

Those of ordinary skill in the art recognize ways to determine whether an element is anti-bacterial (dark). In one embodiment, anti-bacterial exposure results in at least a reduction of 10% (90% remains), at least 50% (50% remains), at least 99% (at least 1% remains), at least 99.9% (at least 0.1% remains) or at least 100% (0% remains). One example of determining whether the element is anti-bacterial (dark) can be by assessing the amount of bacteria present, e.g., reduction or decrease in the number of colonies present after the element is contacted with the bacteria without exposure to visible light.

Those of ordinary skill in the art recognize ways to determine whether an element is anti-viral. One example of determining whether the element is anti-viral can be by assessing, e.g., an inhibition or reduction of the number of virus (phage) colonies. In one embodiment, determining whether the element is anti-viral can be by counting the number of viral colonies present over time after exposure to the element. In one embodiment, anti-viral exposure results in at least a reduction of 10% (90% remains), at least 50% (50% remains), at least 99% (at least 1% remains), at least 99.9% (at least 0.1% remains) or at least 100% (0% remains).

Those of ordinary skill in the art recognize ways to determine whether an element decomposes volatile organic compounds. One example of determining whether the element decomposes volatile organic compounds can be by assessing the degradation of the organic compound under electromagnetic radiation, for example visible light. In one embodiment, determining acetaldehyde degradation as a decrease or % of the initial degradation, e.g. ranging from 0% to 90%, over time, e.g., from 3 to 10 hours, or 5 hours under an amount of visible light, e.g., a blue light emitting LED of 455 nm having 270 mW/cm2 power is an optional way to determine decomposition of volatile organic compounds. In some embodiments, the degradation is at least 50%, 60%, 70%, 80%, 90% or 100% of the initial amount of acetyaldehyde after exposure to the element.

Those of ordinary skill in the art recognize ways to determine whether an element discolors food additives or dyes. One example of determining the discoloration of food additive dyes can be by the decrease or percentage of the initial amount of food dye additive over time. In one example, the food additive can be the natural anthocyanin food additive dye or an FDC food additive dye. In some embodiments, the discoloration of food dye additives can be from 0% to 60% after 5 hours under a blue LED emitting at 455 nm with 45 mW/cm2 power. In some embodiments, the degradation is at least 25%, 30%, 40% 50%, and/or 60% of the initial amount of the natural anthocyanin food additive dye after exposure to the element.

Those of ordinary skill in the art recognize ways to determine whether an element maintains an activity over time, e.g., the durability of the element. In some embodiments, the discoloration of food dye additives decreased from zero % to 60% after 5 hours under a blue LED emitting at 455 nm with 45 mW/cm2 power. For example, in some embodiments, the retention of antibacterial activity is after exposure to 85% relative humidity and 85° C. for at least 7 days.

Exemplary Embodiments:
1. An element comprising:
at least one p-type semiconductor comprising mixed valence oxide compounds, the compound having p-type conduction bands and p-type valence bands; and
at least one n-type semiconductor having a deeper valence band than the p-type semiconductor valence bands, the n-type semiconductor in ionic charge communication with the mixed valence oxide compounds.

2. The element of embodiment 1, further comprising a noble metal in ionic charge communication with the mixed valence oxide compounds.

3. The element of embodiment 2, wherein the noble metal is selected from rhodium, ruthium, palladium, silver, osmium, platinum and gold, 4. The element of embodiment 2 or 3, wherein the noble metal is loaded onto the at least one n-type semiconductor.

5. The element of embodiment 1, 2, 3, or 4 wherein the mixed valence oxide compounds comprise pairs selected from copper(I) and copper(II); cobalt (II) and cobalt (III); Mn(II) and Mn(III); Fe(II) and Fe(III) and Ir(III) and Ir(IV).

6. The element of embodiment 1, 2, 3, 4 or 5 wherein the at least one p-type semiconductor is loaded onto the at least one n-type semiconductor.

7. The element of embodiment 1, 2, 3, 4, 5 or 6 wherein the mixed valence oxide compounds are substantially uniformly dispersed onto the at least one n-type semiconductor.

8. The element of embodiment 1, 2, 3, 4, 5, 6 or 7 wherein the mixed valence oxide compounds have a particle size of 100 nm or less.

9. The element of embodiment 5, wherein the copper(I) and copper (II) compound is a $Cu_xO$ compound.

10. The element of embodiment 9, wherein the CuxO compound is chemically valence controlled.

11. The element of embodiment 5, 9 or 10 wherein the ratio of copper(I) and copper (II) is between 10:90 to 90:10.

12. The element of embodiment 1, 2, 3, 4, 5, 6, 8, 9, 10 or 11 wherein the p-type semiconductor is 0.001 to 10 wt % of the element and the p-type semiconductor is 90 to 99.999 wt % of the element.

13. The element of embodiment 1, 2, 3, 4, 5, 6, 8, 9, 10, 11 or 12 wherein the at least one n-type semiconductor is an oxide comprising an element selected from cerium, tungsten, tantalum, tin, zinc, strontium, zirconium, barium, indium or aluminum oxide.

14. The element of embodiment 1, 2, 3, 4, 5, 6, 8, 9, 10, 11, 12 or 13 wherein the at least one n-type semiconductor is selected from $Sn-Ti(O,C,N)_2$, $CeO_2$, $KTaO_3$, $Ta_2O_5$, $SnO_2$, $WO_3$, $ZnO$, $SrTiO_3$, $BaTiO_3$, $ZrTiO_4$, $In_2TiO_5$, $Al_2TiO_5$, or $LiCa_2Zn_2V_3O_{12}$.

15. The element of embodiment 1, 2, 3, 4, 5, 6, 8, 9, 10, 11, 12, 13 or 14 wherein the at least one n-type semiconductor is $Al_{2-x}In_xTiO_5$ wherein $0<x<2$.

16. The element of embodiment 1, 2, 3, 4, 5, 6, 8, 9, 10, 11, 12, 13, 14 or 15 wherein the at least one n-type semiconductor is $Zr_{1-y}Ce_yTiO_4$ wherein $0<y<1$.

17. The element of embodiment 1, 2, 3, 4, 5, 6, 8, 9, 10, 11, 12, 13, 14, 15 or 16 wherein the at least one n-type semiconductor is a titanium oxide having a valence band controlled through doping.

18. The element of embodiment 1, 2, 3, 4, 5, 6, 8, 9, 10, 11, 12, 13, 14, 15, 16 or 17 wherein the at least one n-type semiconductor is a titanium oxide doped with a compound selected from N, C or both.

19. The element of embodiment 1, 2, 3, 4, 5, 6, 8, 9, 10, 11, 12, 13, 14, 15, 16, 17 or 18 wherein the at least one n-type semiconductor is a titanium oxide comprising a compound represented by the formula $(Ti_{1-r}M_r)(O_{2-s-t}C_sN_t)$, wherein: M is selected from the group consisting of Sn, Ni, Sr, Ba, Fe, Bi, V, Mo, W, Zn, Cu, and combinations thereof; r is in the range of 0 to 0.25; s is in the range of 0.001 to 0.1; and t is in the range of 0.001 to 0.1.

20. The element of embodiment 1, 2, 3, 4, 5, 6, 8, 9, 10, 11, 12, 13, 14, 15, 16, 17, 18 or 19 comprising a photocatalyst selected from $(Ti_{0.99}Sn_{0.01})(O_{2-s-t}C_sN_t)$, $(Ti_{0.97}Sn_{0.03})(O_{2-s-t}C_sN_t)$, $(Ti_{0.95}Sn_{0.05})(O_{2-s-t}C_sN_t)$, $(Ti_{0.90}Sn_{0.10})(O_{2-s-t}C_sN_t)$, $(Ti_{0.85}Sn_{0.15})(O_{2-s-t}C_sN_t)$, $(Ti_{0.985}Ni_{0.015})(O_{2-s-t}C_sN_t)$, $(Ti_{0.98}Ni_{0.02})(O_{2-s-t}C_sN_t)$, $(Ti_{0.97}Ni_{0.03})(O_{2-s-t}C_sN_t)$, $(Ti_{0.99}Sr_{0.01})(O_{2-s-t}C_sN_t)$, $(Ti_{0.97}Sr_{0.03})(O_{2-s-t}C_sN_t)$, $(Ti_{0.95}Sr_{0.05})(O_{2-s-t}C_sN_t)$, $(Ti_{0.97}Ba_{0.03})(O_{2-s-t}C_sN_t)$, $(Ti_{0.95}Ba_{0.05})(O_{2-s-t}C_sN_t)$, $(Ti_{0.94}Sn_{0.05}Fe_{0.01})(O_{2-s-t}C_sN_t)$, $(Ti_{0.94}Sn_{0.05}Ni_{0.01})(O_{2-s-t}C_sN_t)$, $(Ti_{0.99}Fe_{0.01})(O_{2-s-t}C_sN_t)$, $(Ti_{0.95}Zn_{0.05})(O_{2-s-t}C_sN_t)$, $(Ti_{0.77}Sn_{0.15}Cu_{0.08})(O_{2-s-t}C_sN_t)$, $(Ti_{0.85}Zn_{0.15})(O_{2-s-t}C_sN_t)$, $(Ti_{0.90}Bi_{0.10})(O_{2-s-t}C_sN_t)$, $(Ti_{0.996}V_{0.004})(O_{2-s-t}C_sN_t)$, $(Ti_{0.984}V_{0.016})(O_{2-s-t}C_sN_t)$, $(Ti_{0.970}V_{0.03})(O_{2-s-t}C_sN_t)$, $(Ti_{0.997}M_{0.003})(O_{2-s-t}C_sN_t)$, $(Ti_{0.984}Mo_{0.016})(O_{2-s-t}C_sN_t)$, $(Ti_{0.957}Mo_{0.043})(O_{2-s-t}C_sN_t)$, $(Ti_{0.97}W_{0.03})(O_{2-s-t}C_sN_t)$, $(Ti_{0.95}W_{0.05})(O_{2-s-t}C_sN_t)$, $(Ti_{0.996}V_{0.004})(O_{2-s-t}C_sN_t)$, $(Ti_{0.984}V_{0.016})(O_{2-s-t}C_sN_t)$ and $(Ti_{0.970}V_{0.03})(O_{2-s-t}C_sN_t)$.

21. A method for loading a mixed valence compound comprising: adding a dispersing agent to an n-type compound to more positively charge the surface of the n-type compound; adding a p-type precursor to the dispersing agent and n-type compound, wherein the p-type precursor comprises a Copper (II) cation complex; adding an attracting agent to the n-type compounds to make the surface charge of the n-type semiconductor more negative; and combining the dissimilarly charged materials with each other at a temperature below the doping temperature of the mixed valence compound.

22. The method of embodiment 20, wherein the p-type precursor is bis(ethylenediamine)Copper (II) hydroxide.

EXAMPLES

I. Synthesis

Example 1(a)

Synthesis of an n-type semiconductor (Ex-1)

$Ti(CNO)_2$:Sn (Ex-1): 3.78 g of Tin(II) 2-ethylhexanoate [also known as tin(II) octoate and/or stannous octoate] (Spectrum Chemicals, Gardena, Calif., USA), 30 ml 50 wt % solution of Titanium(IV) bis(ammonium lactato)dihydroxide (titanium lactate, [Tyzor LA]) (Sigma Aldrich, St. Louis, Mo., USA) and 15.0 g of Ammonium nitrate ($NH_4NO_3$) (Sigma Aldrich, St. Louis, Mo., USA) were dissolved in 25 ml of reverse osmosis (RO) purified water, then heated to 150° C. and stirred for 20 minutes. The resulting mixture was then heated at 350° C. for 40 minutes in a preheated muffle furnace under ambient atmosphere (room atmosphere) and pressure conditions. The resulting powder was placed in the preheated muffle furnace and then annealed at 475° C. under ambient conditions for 40 minutes.

Example 1(b)

Loading

Combustion synthesized $Ti(O,C,N)_2$:Sn (6 g) was mixed with 6M HCl (60 mL) at 90° C. for 3 hours in a water bath while stirring. The mixture was then cooled down to room temperature, filtered through 0.2 micron membrane filter paper, washed with 100 to 150 mL of deionized water (DI) water, and finally dried at room temperature overnight for between 10 to 15 h.

The weight fraction of Copper to processed $Ti(O,C,N)_2$:Sn (Ig) was 0.01. 10 mL aqueous solution of $CuCl_2.2H_2O$ (26.8 mg) was stirred with 1 g of processed $Ti(O,C,N)_2$:Sn at 90° C. for 1 h. Then, 1.5 ml of aqueous solution containing NaOH (50 mg) and glucose (250 mg) was added to the reaction mixture at 90° C. while stirring. After the addition of aqueous solution of glucose and NaOH, the mixture was stirred for another 1 h, then cooled down to room temperature, followed by filtration through 0.2 micron membrane, washing with 100 to 150 mL DI water and finally dried it at 110° C. in air oven overnight (10 to 15 h).

Example 1(c)

Comparative Example 1 (CE-1)

CE-1 (Ti(CNO)$_2$:Sn) was prepared in a manner similar to that of Ex-1, except that no loading of Cu$_x$O (step A only) was performed resulting in unloaded Ti(CNO)$_2$:Sn (no Cu$_x$O).

Example 1(d)

Comparative Example 2 (Ex-1A)

Ex-1A was prepared in a manner similar to that of Ex-1b above, except that 25 mg instead of 50 mg of NaOH and 125 mg instead of 250 mg of glucose were used.

Example 1(e)

Comparative Example 3 (Ex-2 and Ex-3)

Ex-2 (Plasma WO$_3$) and Ex-3 (commercial GTP WO$_3$) were prepared in a manner similar to that of Ex-1 above, except that the same molar amounts of Plasma WO$_3$ or commercial GTP-WO$_3$ were used instead of Ti(O,C,N)$_2$:Sn photocatalyst; NaOH was not added to the reaction mixture and the glucose amount was 125 mg instead of 250 mg. Plasma WO$_3$ was made in a similar manner to that described in U.S. patent application Ser. No. 13/738,243, filed Jan. 10, 2013 which is incorporated by reference herein for its teachings regarding the same. GTP WO$_3$ was purchased from Global Tungsten & Powder (Towanda, Pa., USA) and used without additional purification or annealing.

0.159 mL of 1 molar solution Bis(Ethylenediamine) copper (II) hydroxide was mixed with 10 mL of RO water and it was stirred with 1 g of WO$_3$ at 90° C. for 1 h. Then, glucose (125 mg) was added to the reaction mixture at 90° C. while stirring. After the addition of the aqueous solution of glucose the mixture was stirred for another 1 h, then cooled down to room temperature, followed by filtration through 0.2 micron membrane, washing with 100 to 150 mL DI water and finally dried it at 110° C. in air oven overnight (10 to 15 h).

Example 1(f)

Comparative Example 4 (Ex-4, Ex-5, Ex-6, CE-2)

Ex-4, Ex-5, Ex-6 and CE-2 were prepared in a manner similar to that of Ex-1, except that the same molar amounts of CeO$_2$ were used instead of Ti(O,C,N)$_2$:Sn. In addition, the loading conditions were modified as follows: Ex-4: aqueous solution of NaOH (25 mg) and glucose (125 mg); Ex-5: without glucose; Ex-6: the concentration of glucose (62.5 mg) and NaOH (25 mg).

CE-2 is analogous to CE-1, except that CE-2 is an equivalent unloaded molar amount (to Ti(O,C,N)$_2$:Sn) of CeO$_2$ (Sigma Aldrich, St. Louis, Mo., USA). CeO$_2$ was used as received from the vendor without additional purification or annealing.

Example 1(g)

Comparative Example 5 (Ex-7, CE-3)

Ex-7 was prepared in a manner similar to that of Ex-1 above, except that the same molar amount of insulator, Al$_2$O$_3$ was used instead of Ti(O,C,N)$_2$:Sn, 25 mg of NaOH was used, and 125 mg of glucose was used. The Cu$_x$O loading was 1 wt % Cu with respect to Al$_2$O$_3$. CE-3 is analogous to CE-1, except that CE-3 is an equivalent unloaded molar amount (to Ti(O,C,N)$_2$:Sn) of Al$_2$O$_3$. Al$_2$O$_3$ was used as received from the vendor without additional purification or annealing.

Example 1(i)

Comparative Example 6 (Ex-8, CE-4)

Ex-8 was prepared in a manner similar to that of Ex-1 above, except that the same molar amount of n-type UV active photocatalyst, Ta$_2$O$_5$ was used instead of Ti(O,C,N)$_2$:Sn, 25 mg of NaOH and 125 mg of glucose were used. The Cu$_x$O loading was 1 wt % Cu with respect to Ta$_2$O$_5$. CE-4 is analogous to CE-1, except that CE-4 is an equivalent unloaded molar amount (to Ti(O,C,N)$_2$:Sn) of Ta$_2$O$_5$ (Sigma Aldrich, St. Louis, Mo., USA). Ta$_2$O$_5$ was used as received from the vendor without additional purification or annealing.

Example 1(j)

Comparative Example 7 (Ex-9, Ex-10, Ex-11)

Ex-9 was prepared in a manner similar to that of Ex-1 above, except that the same amount of n-type UV active photocatalyst, SnO$_2$ was used instead of Ti(O,C,N)$_2$:Sn. The Cu$_x$O loading was 1 wt % Cu with respect to SnO$_2$. The nanosize SnO$_2$ (US Research Nanomaterial, Houston, Tex., USA) had been annealed at 900° C. in a box furnace in air for 1 h. It was then soaked in 6M HCl aqueous solution as in Ex-1. In Ex-10, the amount of NaOH was 25 mg and the amount of glucose used was 125 mg. In Ex-11, the amount of NaOH was 75 mg and the amount of glucose was 375 mg. With varying amounts of NaOH and glucose while loading fixed amount of 1 wt % Cu with respect of SnO$_2$, different appearances of body color resulted.

Example 1(K)

Comparative Example 8 (Ex-12, CE-5, Ex-13)

Ex-12 was prepared in a manner similar to that of Ex-1b above. Loading of Cu$_x$O was performed on rutile TiO$_2$ (Tayca, Inc. Osaka, JP) except that 25 mg instead of 50 mg of NaOH and 125 mg instead of 250 mg of glucose were used.

CE-5 is analogous to CE-1, except that CE-5 is an equivalent unloaded molar amount (to Ti(O,C,N)$_2$:Sn) of Rutile TiO2 (Tayca, Inc. Osaka, JP). Rutile TiO2 was used as received from the vendor without additional purification or annealing.

Ex-13: 10 g Commercial WO$_3$ (Global Tungsten Powder, Sylvania, Pa., USA) was annealed at 400° C. for 1 hour. [Pt(NH$_3$)$_4$]Cl$_2$ (0.181 mg Alfa Aesar, Ward Hill, Mass., USA)] was dissolved in 15.0 mL RO water and stirred with 2.0 g of the annealed WO$_3$ at room temperature (RT) for 2 h.

Then, it was filtered through membrane filter paper of pore size 0.2 micron and washed with RO water and dried at 120° C. overnight. The resulting material was annealed at 400° C. for another 1 h in air.

Example 1(L)

Comparative Example 9 (Ex-13-17, CE-6)

Examples 14-17 were prepared in a manner similar those described above except that different amounts of [Pt(NH$_3$)$_4$]Cl$_2$] and/or IrCl$_3$/IrO$_2$ were dissolved in the 15 mL of RO water. See Table 1:

TABLE 1

| Example | Amount [Pt(NH3)4]Cl2 | Wt % [Pt(NH3)4]Cl2 | Amount IrCl3 | Wt % IrCl3 | Amount WO$_3$ |
|---|---|---|---|---|---|
| Ex-13 | 1.44 mg | 0.05 Wt % | 0 mg | 0.00 Wt % | 2 g |
| Ex-14 | 2.88 mg | 0.1 Wt % | 0 mg | 0.00 Wt % | 2 g |
| Ex-15 | 5.76 mg | 0.2 Wt % | 0 mg | 0.00 Wt % | 2 g |
| Ex-16 | 0 mg | 0.00 Wt % | 3.046 mg | 0.1 wt. % IrO$_2$ | 2 g |
| Ex-17 | 0.144 mg | 0.05 Wt % | 3.046 mg | 0.1 wt. % IrO2 | 2 g |
| CE-6 | 0.00 mg | 0.00 Wt % | 0.00 mg | 0.00 Wt % | 2 g |

CE-6 is analogous to CE-1, except that CE-5 is an equivalent unloaded molar amount (to Ti(O,C,N)$_2$:Sn) of WO$_3$ (Global Tungsten Powder, PA, USA).
WO$_3$ was used as received from the vendor without additional purification or annealing.

Example 2

Characterization of Supported P-Cats

Example 2(a)

Powder XRD characterization (Ex-1A, CE-1, Ex-4, CE-2, Ex-7 and CE-3)

Figure 3:
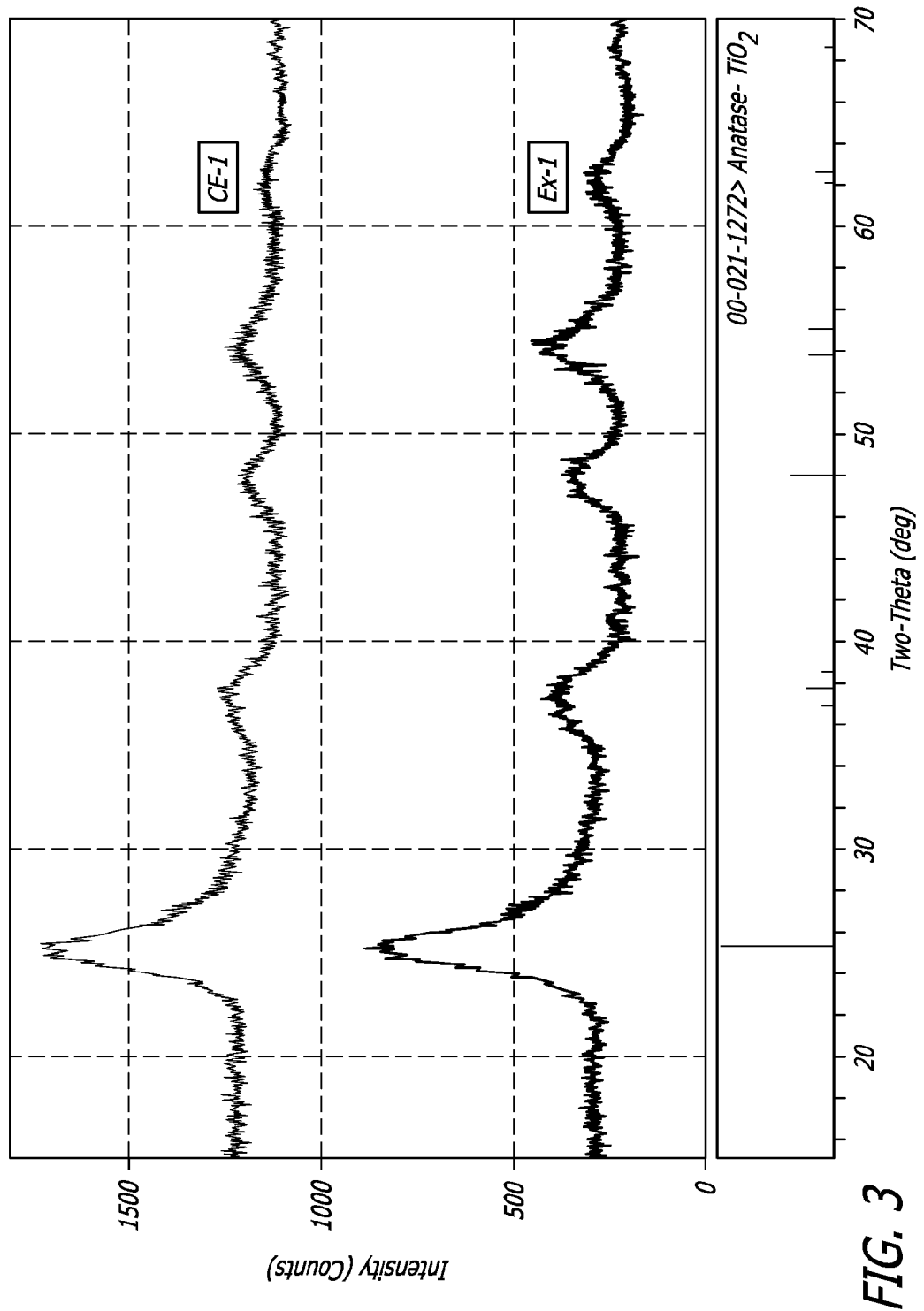
FIG. 3 shows the x-ray diffraction patterns of an embodiment of a p-type and n-type composite material described herein with that of the n-type material alone.

Powder samples of Ex-1A, CE-1, Ex-4, CE-2, Ex-7 and CE-3 were analyzed using powder x-ray diffraction using Cu K-alpha radiation (Rigaku Miniflex II [Rigaku Americas, Woodland, Tex., USA) with 1°/min. The result of the X-ray diffraction analysis of Ex-1 and CE-1 is shown in FIG. 3 and confirms the presence of anatase TiO$_2$. It was confirmed from XRD patterns (FIG. 3) that the anatase phase of Ti(O,C,N)$_2$:Sn is retained even after CuxO loading because comparison of the resulting XRD spectrogram with Joint committed powder diffraction standards, card no. 00-021-1272 [anatase-TiO2] (JCPDS) by International Centre for Diffraction Data (Newton Square, Pa., USA) exhibits substantially the same peaks as the anatase phase spectrogram (the phase of the material generally visible light photocatalytically active).

Figure 4:
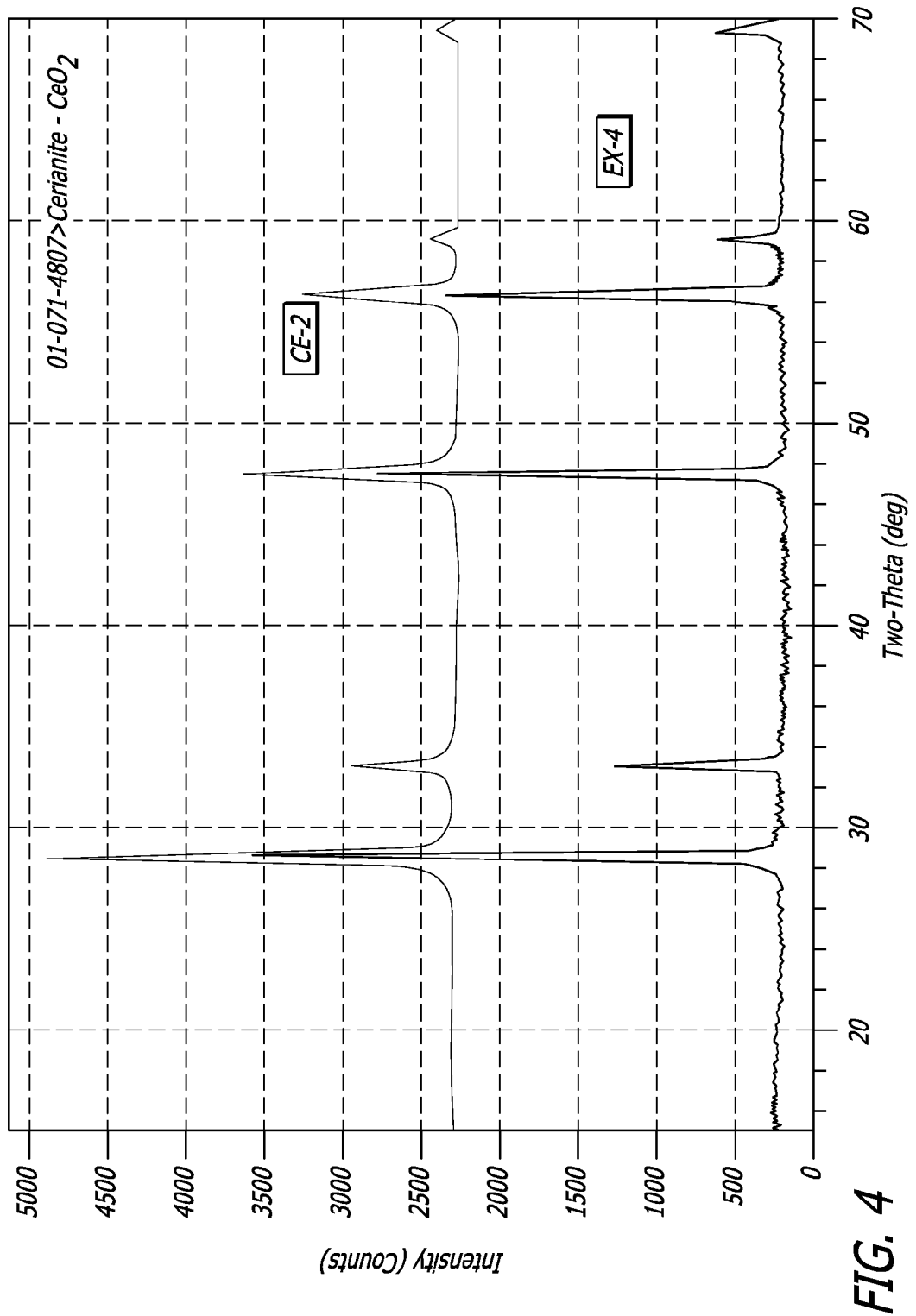
FIG. 4 shows the x-ray diffraction patterns of another embodiment of a p-type and n-type composite material described herein with that of the n-type material alone.
Figure 5:
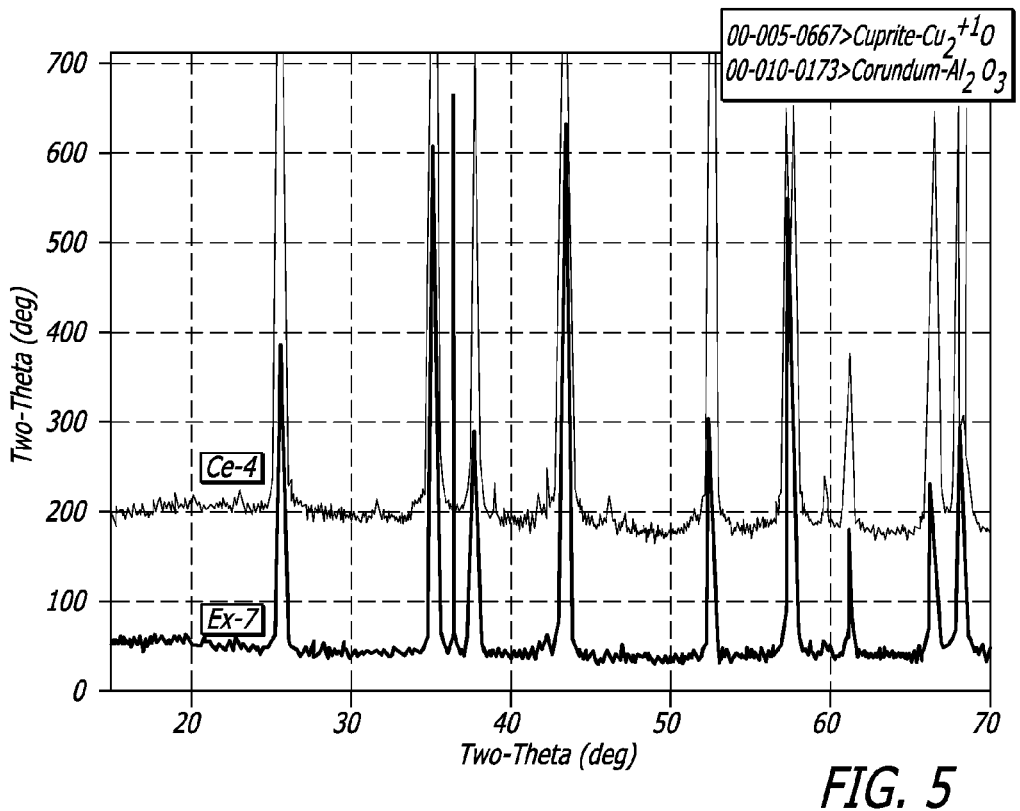
FIG. 5 shows the x-ray diffraction patterns of another embodiment of a p-type and n-type composite material described herein with that of the n-type material alone.

In addition, powder samples of Ex-4 and Ex-7 were analyzed in a manner similar to that of Ex-1A above, except that equal molar amounts of Ex-4 and Ex7 were used instead of Ex-1A. The results are shown in FIGS. 4 and 5, respectively-using powder x-ray diffraction using Cu K-alpha radiation (Rigaku Miniflex II [Rigaku Americas, Woodland, Tex., USA) with 1°/min. The result of the X-ray diffraction shown in FIGS. 4 and 5 confirms the CuxO loading did not substantially affect the bulk semiconducting phase of the respective n-type material Example 2(b)

DRS Characterization

Figure 6:
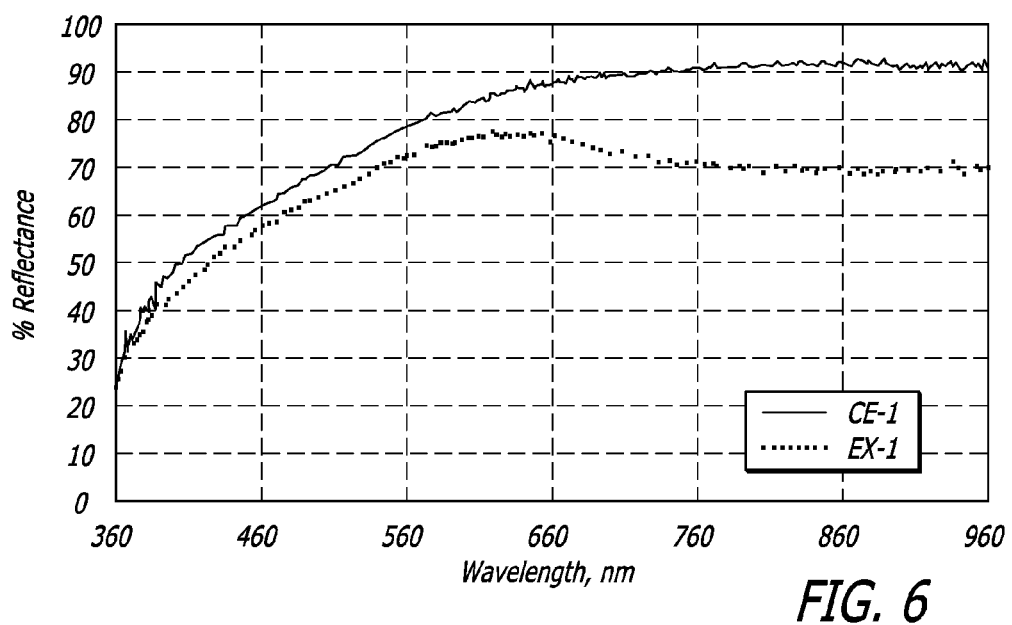
FIG. 6 shows the diffuse reflectance spectra comparing embodiments of a p-type and n-type composite material described herein and that of the n-type material alone. Ti(OCN)2:Sn
Figure 7:
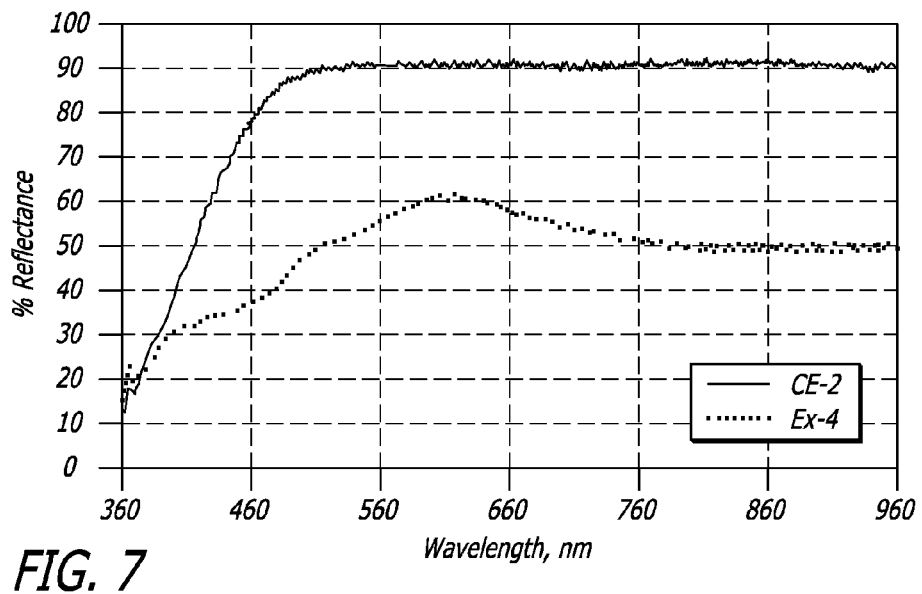
FIG. 7 shows the diffuse reflectance spectra comparing another embodiment of a p-type and n-type composite material described herein that of the n-type material alone.CeO2
Figure 8:
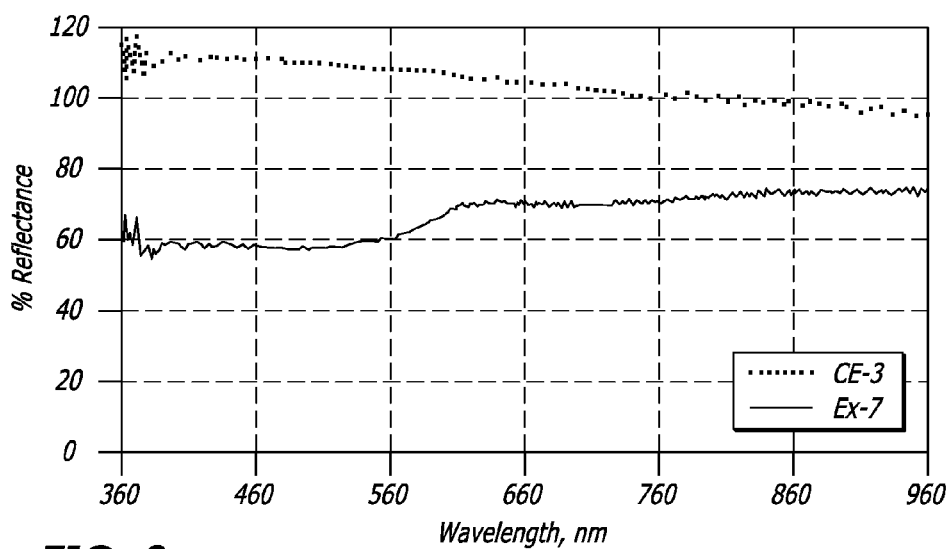
FIG. 8 shows the diffuse reflectance spectra comparing another embodiment of a p-type and n-type composite material described herein that of the n-type material alone.

Powder samples of Ex-1A, CE-1 (FIG. 6); Ex-4 and CE-2 (FIG. 7), Ex-7 and CE-3 (FIG. 8) were analyzed using diffuse reflectance spectroscopy (DRS). The results are shown in FIGS. 6, 7 and 8, and indicate that at least tin doping (Ex-1A), CeO$_2$ (Ex-4) and Al$_2$O$_3$ (Ex-7) appeared to improve absorption in the visible spectrum (400 nm to 800 nm), whereas CE-1,CE-2 and CE-3 did not. Therefore, the anatase TiO2 observed in the XRD pattern and visible absorption due to the anatase phase confirmed the loading of Ti(O,C,N)$_2$:Sn, CeO$_2$, and Al$_2$O$_3$ on the substrate. The loaded Cu$_x$O had absorption in the longer wavelength side of absorption edge of semiconductors and if the loaded Cu$_x$O had a mixture of CuO and Cu$_2$O, then their characteristics absorptions between 600 and 800 nm and 500 and 600 nm respectively would have been observed, in addition to absorption of loaded Cu$_x$O.

Example 3

Experimental Set-Up for Photocatalysis (Ex-1A and CE-1)

Ex-1A (130 mg), as prepared according to the methods described earlier in this disclosure, was added to 1.04 ml DI water in order to make a coating solution which was 10 wt % solid materials in water. The resulting dispersion was homogenized using an ultrasonic homogenizer. A glass substrate (50 mm×75 mm) was coated with the prepared resultant by using a spin coater (1200 rpm/40 sec). The coated substrate was heated for 2 minutes at 120° C. Another slide was prepared in the same manner except that CE-1 (130 mg) was used instead of Ex-1A.

Figure 9:
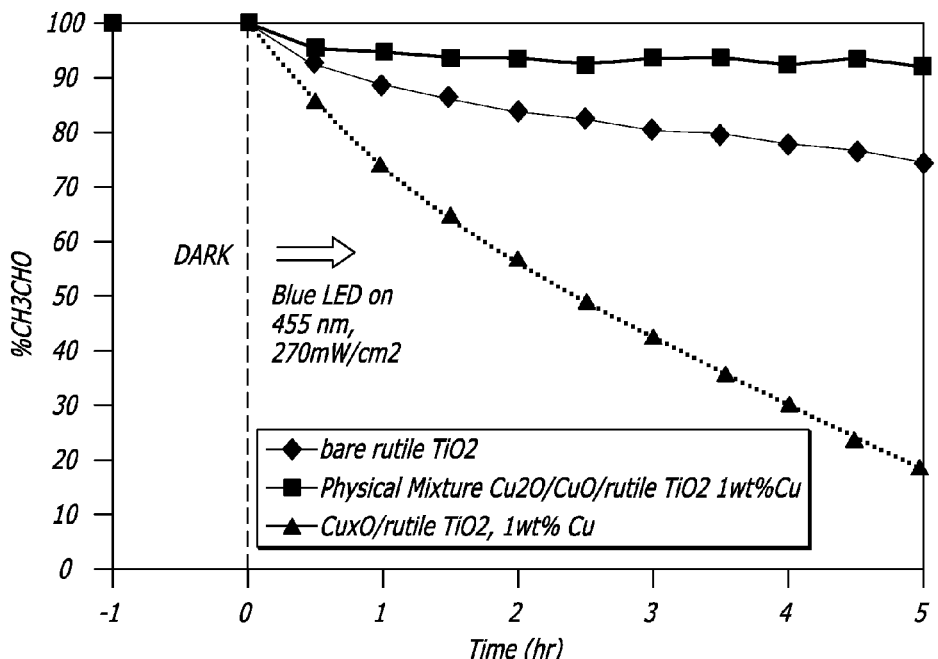
FIG. 9 is a graph showing the decomposition of acetylaldehyde by various photocatalytic composites, Ex-1A and CE-1 described herein.

The spin coated glass slides were heated at 120° C. on a hot plate under full spectrum irradiation by an Xe lamp (lamp power output 300 W) for 1 hour. Each slide was then sealed in a separate 5 L Tedlar bag under vacuum, followed by injecting 3 L of ambient air and 80 mL of 3500 ppm acetaldehyde. Each bag was lightly massaged for 2 minutes by hand then placed in the dark for 15 min. The acetaldehyde concentration was estimated by Gas Chromotagraphy-Flame Ionization Detector (GC-FID) to be at 80±2 ppm. Each Tedlar bag containing a sample was placed back in the dark for 1 hour. The slide/Tedlar bag was exposed to array blue LED of 455 nm with light intensity of 270 mW/cm$^2$. A sample was collected every 30 minutes by an automated injection port of GC-FID and the amount of remaining acetaldehyde was estimated at subsequent 30 minute intervals. FIG. 9 is a graph illustrating Ex-1A VOC performance data. The graph shows that generally when Ti(CNO):Sn is combined with CuxO (Ex-1A), performance is improved when compared to bare Ti(CNO):Sn (CE-1).

Example 4

Antibacterial Experiments

Example 4A

Substrate (1"×2" glass slide) was prepared by sequential application of 70% IPA (Isopropyl Alcohol) and 100% ethanol (EtOH) and then dried in air. Ex-1A was dispersed in 100% EtOH at 2 mg/mL concentration and then 100 uL of the suspension was applied to the substrate, and then dried. The application process was repeated 5 times to attain 1 mg of Ex-1A on the substrate. The substrate was then dried at room temperature. The coated substrates were placed in a glass dish with a water soaked filter paper for maintaining moisture, and glass spacers were inserted between the substrate and the filter paper to separate them.

E. coli (ATCC 8739) was streaked onto a 10 cm diameter petri dish containing 20 ml of LB (lysogeny broth/luria broth) agar, and incubated at 37° C. overnight. For each experiment, a single colony was picked to inoculate 3 mL nutrient broth, and the innoculated culture was incubated at 37° C. for 16 hours to create an overnight culture (~109 cells/mL). A fresh log-phase culture of the overnight culture was obtained by diluting the overnight culture ×100, inoculating another 5 cm petri dish with LB agar and incubating at 37° C. for 2.5 hr. The fresh culture was diluted 50× with 0.85% saline, which gave a cell suspension of $2\times10^6$ cells/mL. 50 µL of the cell suspension was pipetted onto each deposited glass substrate. A sterilized (in 70% and then 100% EtOH) plastic film (20 mm×40 mm) was placed over the suspension to spread evenly under the film. The specimen was kept in the dark (CuxO2-Dark) or then irradiated under blue LED light (455 nm, 10 mW/cm2) (CuO2-light). At chosen time points, e.g., 30 min/60 min increments, the specimen was placed in 10 mL of 0.85% saline and vortexed to wash off the bacteria. The wash off suspension was retained, then serially diluted using 0.85% saline, and then plated on LB agar and incubated at 37° C. overnight to determine the number of viable cells in terms of CFU/Specimen.

Figure 10:
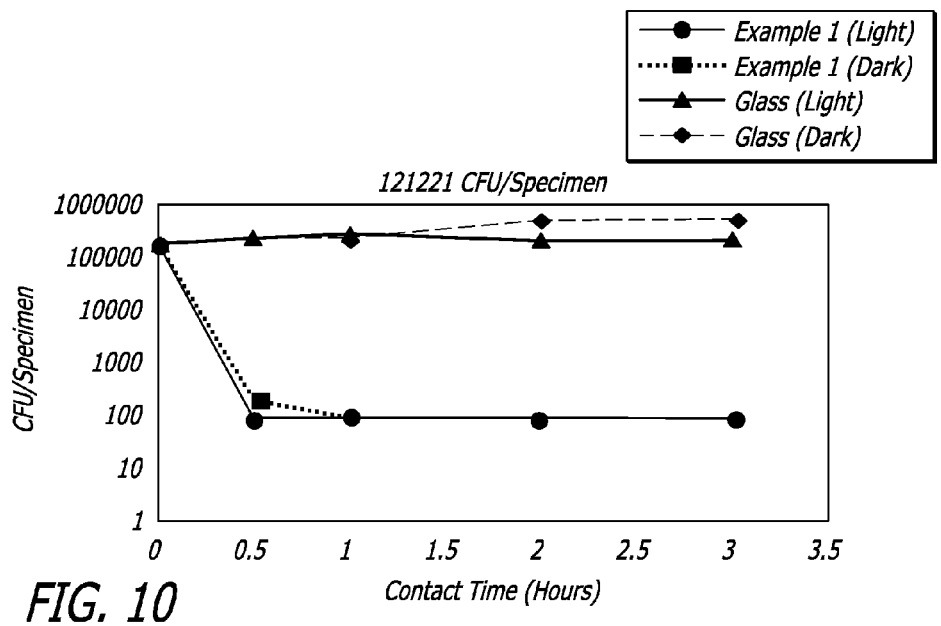
FIG. 10 is a graph showing the antibacterial activity (CFU/Specimen) on E. Coli by various photocatalystic composites, Ex-1A and CE-1 described herein after exposure to visible light of 800 lux from a fluorescent lamp.
Figure 11:
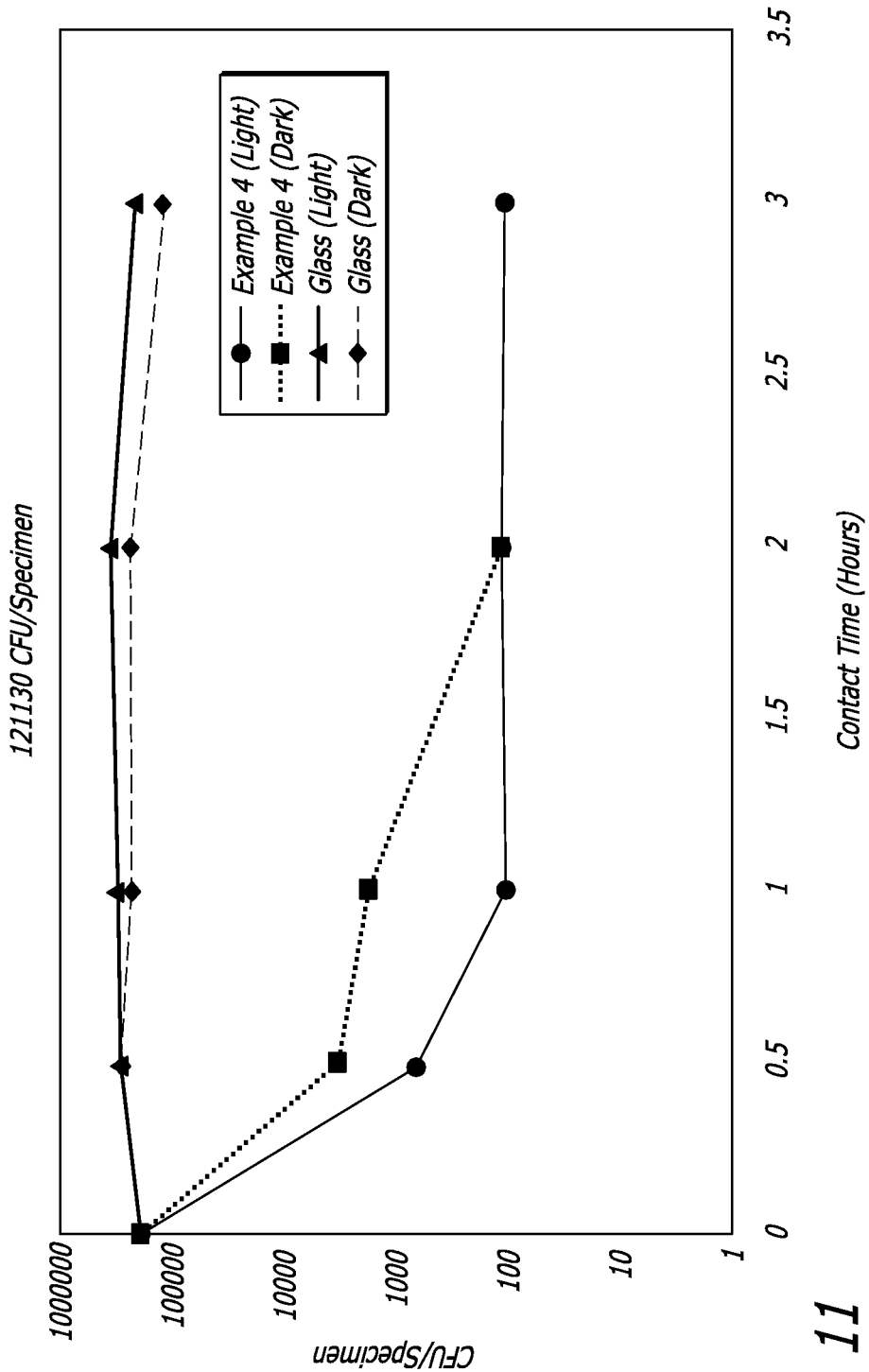
FIG. 11 is a graph showing the antibacterial activity (CFU/Specimen) on E. Coli by various photocatalytic composites, Ex-4 and CE-2 described herein after exposure to visible light of 800 lux from a fluorescent lamp.

The results are shown in FIGS. 10 and 11. It appears that E-coli killing property due to presence of flexible copper ion was observed even in the dark within 30 min (See FIGS. 10 and 11).

FIG. 10 also shows the property of $Cu^{1+}$ after loading on $CeO_2$ that complete killing of E-coli is observed in 1 h for dark as well as under 10 mW/cm2 blue LED of 455 nm light. Therefore, CuxO loaded $CeO_2$ is a good functional material for E-Coli killing.

Example 4B

Figure 12A:
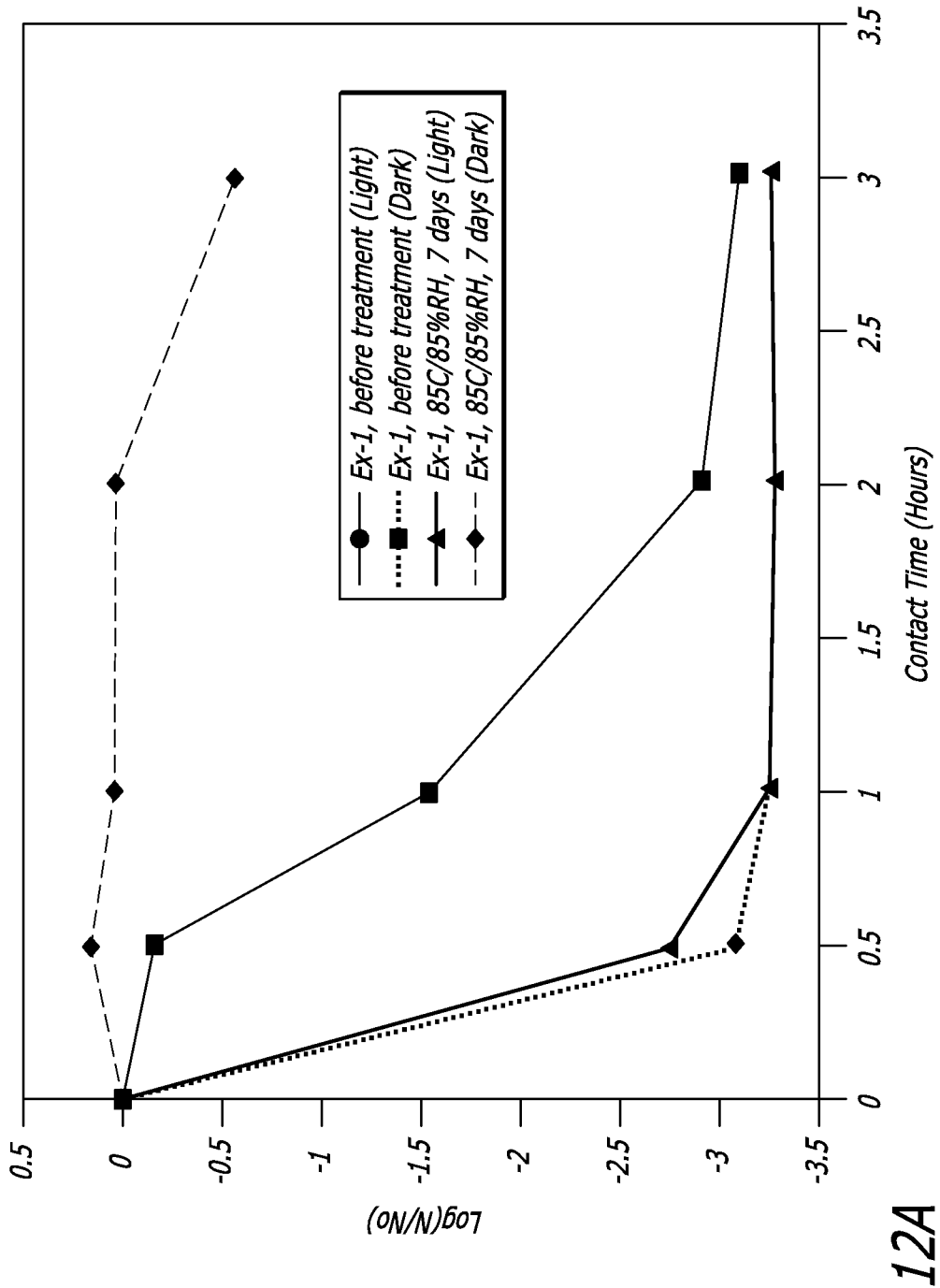
FIG. 12A is a graph showing the enhanced durability antibacterial activity on E-coli by photocatalytic composites, Ex-1, before and after treated to 85° C./85% relative humidity (RH) for 7 days

Ex-1 powder was prepared as described in Example 1. The powder was then kept in the dark at 85% relative humidity and 85° C. for a period of 7 days. The slide[s] were then prepared and tested for antibacterial activity in the same manner as described in Example 4A. The results are shown in FIG. 12A. The results show that even after exposure to 85% relative humidity and 85° C. for a period of 7 days, Ex-1 demonstrated retained photocatalytic activity.

Example 4C

Figure 12B:
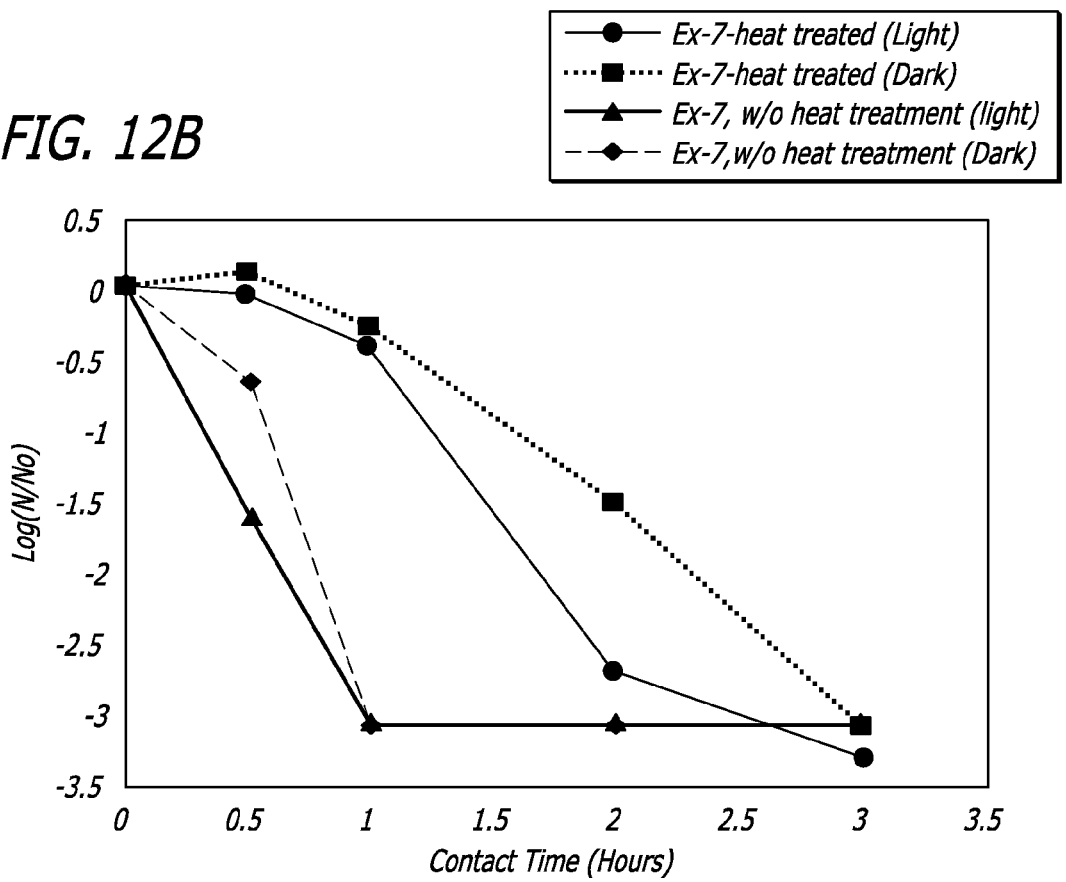
FIG. 12B is a graph showing the enhanced durability antibacterial activity on E-coli by photocatalytic composites, Ex-7, before and after treated to 300° C. for 20 min.

Ex-7 powder was prepared as described above. The powder was then kept in the dark at 300° C. for 20 minutes. The slide[s] were then prepared and tested for antibacterial activity in the same manner as described in Example 4A. The results are shown in FIG. 12B. The results show that even after exposure to 300° C. for 20 minutes, Ex-7 retained photocatalytic activity.

Example 5

Photocatalysis Experiments for Dye Discoloration Studies Example 5A

Figure 13:
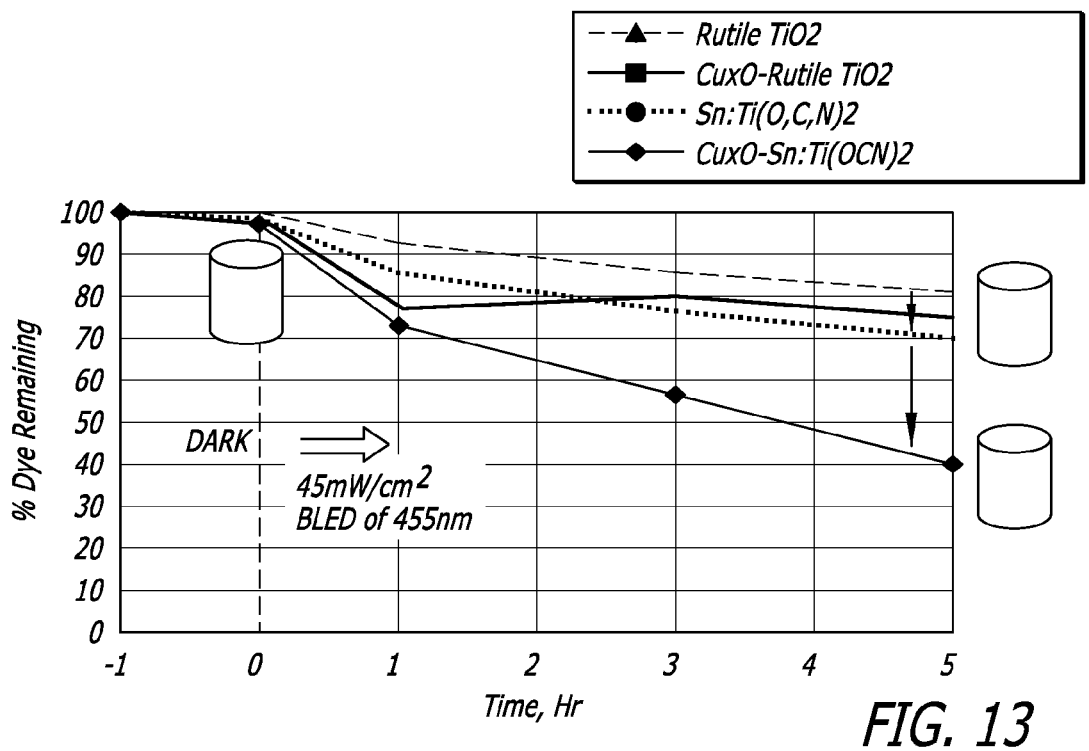
FIG. 13 is a graph showing the dye discoloration of natural blue color by various photocatalytic composites, Example 1 and CE-1 described herein along with rutile TiO2 with and without CuxO loading.

The photocatalytic properties for Ex-1, CE-1 and rutile TiO2 loaded with and without CuxO were compared by measuring the degradation of food additive dye (Natural Blue Colored powder, Color Maker, Anaheim, Calif., USA) as natural blue color powder. 2.85 g of the natural blue color powder was dissolved in 100 mL of RO water creating a blue powder stock solution. 150 mg of each sample was placed in RO water (27 mL) with natural blue color 3 mL of blue powder stack solution for 1 hour without any light and then exposed to a blue light emitting diode (455 nm, 45 mW/cm²) for 5 hours. The degradation of the resulting blue colored solution was measured at 1 h, 3 h and 5 h by monitoring its concentration using UV-Vis absorption spectroscopy (Cary-50, Spectrophotometer Agilent Technologies, Santa Clara, Calif., USA). The concentration was calculated as intensity of the peak at 600 nm. The results are shown in FIG. 13. Table 2 below compares the final degradation results of the four photocatalytic materials.

TABLE 2

Comparison of final dye discoloration results by four different photocatalysts.

| Pcat | % dye lost after 5 h under 455 nm blue LED w/ 45 mw/cm² |
|---|---|
| CE-5 | 19% |
| EX-12 | 25% |
| CE-1 | 31% |
| Ex-1b | 60% |

Example 5B 130 mg of each powdered sample (Examples 14-18 described above) was dissolved in a minimal amount of RO water (ca-15 mL) and homogenized for 5 minutes.

A clean petri dish was wiped with ethanol and the inside surface of the dish was ionized with a plasma device for 1 to 2 minutes. The homogeneous sample of each compound was poured into the treated petri dish and then heated at 120° C. while swirling to increase uniform distribution of the sample as it dried. After the sample had dried, the Petri Dish was placed under a UV Lamp (300 W) for 1 hour. Each petri dish was then sealed in a separate 5 L Tedlar bag under vacuum, followed by injecting 3 L of ambient air and 80 mL of 3500 ppm acetaldehyde. Each bag was lightly massaged for 2 minutes by hand then placed in the dark for 15 min. The acetaldehyde concentration was estimated by Gas Chromotagraphy-Flame Ionization Detector (GC-FID) to be at 80±2 ppm. Each Tedlar bag containing a sample was placed back in the dark for 1 hour. The slide/Tedlar bag was exposed to array blue LED of 455 nm with light intensity of 0.656 mW/cm². A sample was collected every 30 minutes by an automated injection port of GC-FID and the amount of remaining acetaldehyde was estimated at subsequent 30 minute intervals. The results are shown in Table 3 below.

TABLE 3

| Photocatalyst | % Acetylaldehyde lost after 5 h under BLED of 455 nm (0.656 mW/cm$^2$) |
|---|---|
| Bare GTP WO$_3$ (CE-6) | 38.84% |
| 0.05 mol % Pt on GTP WO$_3$ (EX-13) | 49.13% |
| 0.1 mol % Pt on GTP WO$_3$ (Ex-14) | 54.07% |
| 0.1 mol % Ir GTP WO$_3$ (Ex-16) | 38.62% |
| 0.05 mol % Pt + 0.1 mol % Ir on GTP WO$_3$ (1$^{st}$ time) (Ex-17) | 64.46% |
| 0.05 mol % Pt + 0.1 mol % Ir on GTP WO$_3$ (2$^{nd}$ time) (Ex-17) | 63.38% |
| 0.05 mol % Pt + 0.1 mol % Ir on GTP WO$_3$ (3$^{rd}$ time) (Ex-17) | 59.52% |

Figure 14:
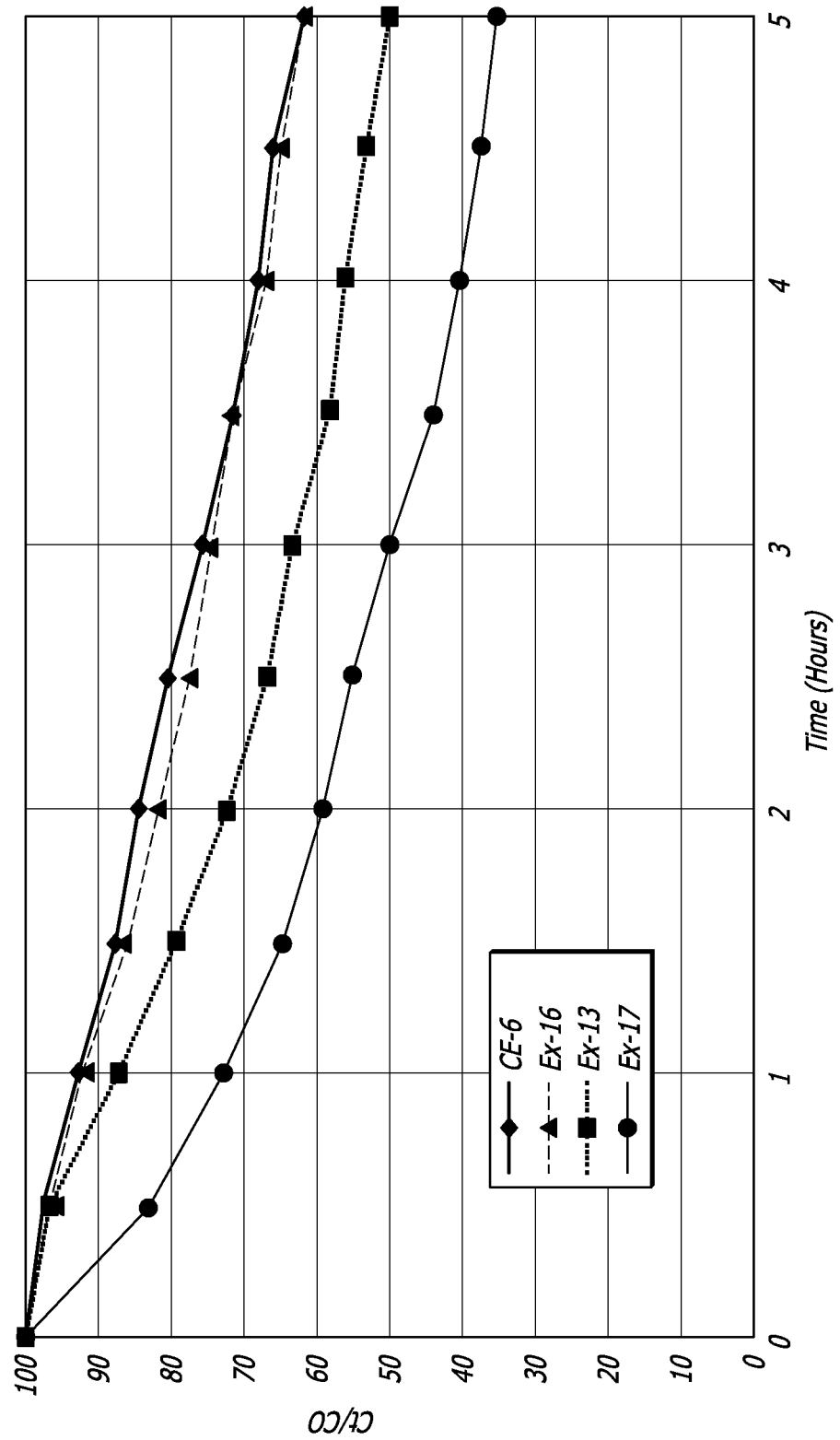
FIG. 14 is a graph showing the decomposition of acetaldehyde by various photocatalytic composites, Ex-12, 13, 15, 16 and CE-6 described herein.

FIG. 14 shows the decomposition rate of acetylaldehyde (Ct/Co) with WO$_3$ (commercial GTP) (CE-6), 0.05 mol % Pt loaded WO$_3$ (Ex-13), 0.1 mol % IrO$_2$ loaded WO$_3$ (Ex-16) and both 0.05 mol % Pt and 0.1 mol % IrO$_2$ loaded WO$_3$ (two times) (Ex-17). It is quite interesting to observe the results that Pt loading has a positive effect and IrO$_2$ alone loaded WO$_3$ has no effect on acetaldehyde decomposition under blue LED of 455 nm (0.656 mW/cm$^2$). However, when both Pt (0.05 mol %) and IrO$_2$ (0.1 mol %) loaded on WO$_3$ has resulted in further enhancement in the photodegradation of acetaldehyde under the same conditions when compared to that of Pt (0.05 mol %) alone or IrO$_2$ (0.1 mol %) alone or bare GTP WO$_3$ alone.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. An element comprising:
    at least one p-type semiconductor comprising mixed valence oxide compounds, the compound having p-type conduction bands and p-type valence bands; and
    at least one n-type semiconductor having a deeper valence band than the p-type semiconductor valence bands, the n-type semiconductor in ionic charge communication with the mixed valence oxide compounds; and
    wherein the at least one n-type semiconductor is a titanium oxide having a valence band controlled through doping.

2. The element of claim 1, further comprising a noble metal in ionic charge communication with the mixed valence oxide compounds.

3. The element of claim 2, wherein the noble metal is selected from rhodium, ruthium, palladium, silver, osmium, platinum and gold.

4. The element of claim 2, wherein the noble metal is loaded onto the at least one n-type semiconductor.

5. The element of claim 1, wherein the mixed valence oxide compounds comprise pairs selected from copper(I) and copper(II); cobalt(II) and cobalt (III); Mn(II) and Mn(III); Fe(II) and Fe(III) and Ir(III) and Ir(IV).

6. The element of claim 1, wherein the at least one p-type semiconductor is loaded onto the at least one n-type semiconductor.

7. The element of claim 1, wherein the mixed valence oxide compounds are substantially uniformly dispersed onto the at least one n-type semiconductor.

8. The element of claim 1, wherein the mixed valence oxide compounds have a particle size of 100 nm or less.

9. The element of claim 5, wherein the copper(I) and copper(II) compound is a Cu$_x$O compound.

10. The element of claim 9, wherein the Cu$_x$O compound is chemically valence controlled.

11. The element of claim 5, wherein the ratio of copper(I) and copper(II) is between 10:90 to 90:10.

12. The element of claim 1, wherein the p-type semiconductor is 0.001 to 10 wt % of the element and the p-type semiconductor is 90 to 99.999 wt % of the element.

13. An element comprising:
    at least one p-type semiconductor comprising mixed valence oxide compounds, the compound having p-type conduction bands and p-type valence bands; and
    at least one n-type semiconductor having a deeper valence band than the p-type semiconductor valence bands, the n-type semiconductor in ionic charge communication with the mixed valence oxide compounds; and
wherein the at least one n-type semiconductor is $Al_{2-x}In_x TiO_5$ wherein $0<x<2$.

14. An element comprising:
at least one p-type semiconductor comprising mixed valence oxide compounds, the compound having p-type conduction bands and p-type valence bands; and
at least one n-type semiconductor having a deeper valence band than the p-type semiconductor valence bands, the n-type semiconductor in ionic charge communication with the mixed valence oxide compounds; and
wherein the at least one n-type semiconductor is $Zr_{1-y}Ce_y TiO_4$ wherein $0<y<1$.

15. The element of claim 1, wherein the at least one n-type semiconductor is a titanium oxide doped with an atom selected from N, C or both.

16. An element comprising:
at least one p-type semiconductor comprising mixed valence oxide compounds, the compound having p-type conduction bands and p-type valence bands; and
at least one n-type semiconductor having a deeper valence band than the p-type semiconductor valence bands, the n-type semiconductor in ionic charge communication with the mixed valence oxide compounds; and
wherein the at least one n-type semiconductor is a titanium oxide comprising a compound represented by the formula $(Ti_{1-r}M_r)(O_{2-s-t}C_sN_t)$, wherein:
M is selected from the group consisting of Sn, Ni, Sr, Ba, Fe, Bi, V, Mo, W, Zn, Cu, and combinations thereof;
r is in the range of 0 to 0.25;
s is in the range of 0.001 to 0.1; and
t is in the range of 0.001 to 0.1.

17. An element comprising:
at least one p-type semiconductor comprising mixed valence oxide compounds, the compound having p-type conduction bands and p-type valence bands; and
at least one n-type semiconductor having a deeper valence band than the p-type semiconductor valence bands, the n-type semiconductor in ionic charge communication with the mixed valence oxide compounds; and
wherein at least one n-type semiconductor is $(Ti_{0.99}Sn_{0.01})(O_{2-s-t}C_sN_t)$, $(Ti_{0.97}Sn_{0.03})(O_{2-s-t}C_sN_t)$, $(Ti_{0.95}Sn_{0.05})(O_{2-s-t}C_sN_t)$, $(Ti_{0.90}Sn_{0.10})(O_{2-s-t}C_sN_t)$, $(Ti_{0.85}Sn_{0.15})(O_{2-s-t}C_sN_t)$, $(Ti_{0.985}Ni_{0.015})(O_{2-s-t}C_sN_t)$, $(Ti_{0.98}Ni_{0.02})(O_{2-s-t}C_sN_t)$, $(Ti_{0.97}Ni_{0.03})(O_{2-s-t}C_sN_t)$, $(Ti_{0.99}Sr_{0.01})(O_{2-s-t}C_sN_t)$, $(Ti_{0.97}Sr_{0.03})(O_{2-s-t}C_sN_t)$, $(Ti_{0.95}Sr_{0.05})(O_{2-s-t}C_sN_t)$, $(Ti_{0.97}Ba_{0.03})(O_{2-s-t}C_sN_t)$, $(Ti_{0.95}Ba_{0.05})(O_{2-s-t}C_sN_t)$, $(Ti_{0.94}Sn_{0.05}Fe_{0.01})(O_{2-s-t}C_sN_t)$, $(Ti_{0.94}Sn_{0.05}Ni_{0.01})(O_{2-s-t}C_sN_t)$, $(Ti_{0.99}Fe_{0.01})(O_{2-s-t}C_sN_t)$, $(Ti_{0.95}Zn_{0.05})(O_{2-s-t}C_sN_t)$, $(Ti_{0.77}Sn_{0.15}Cu_{0.08})(O_{2-s-t}C_sN_t)$, $(Ti_{0.85}Zn_{0.15})(O_{2-s-t}C_sN_t)$, $(Ti_{0.90}Bi_{0.10})(O_{2-s-t}C_sN_t)$, $(Ti_{0.996}V_{0.004})(O_{2-s-t}C_sN_t)$, $(Ti_{0.984}V_{0.016})(O_{2-s-t}C_sN_t)$, $(Ti_{0.970}V_{0.03})(O_{2-s-t}C_sN_t)$, $(Ti_{0.997}Mo_{0.003})(O_{2-s-t}C_sN_t)$, $(Ti_{0.98}Mo_{0.016})(O_{2-s-t}C_sN_t)$, $(Ti_{0.957}Mo_{0.043})(O_{2-s-t}C_sN_t)$, $(Ti_{0.97}W_{0.03})(O_{2-s-t}C_sN_t)$, $(Ti_{0.95}W_{0.05})(O_{2-s-t}C_sN_t)$, $(Ti_{0.996}V_{0.004})(O_{2-s-t}C_sN_t)$, $(Ti_{0.984}V_{0.016})(O_{2-s-t}C_sN_t)$ or $(Ti_{0.970}V_{0.03})(O_{2-s-t}C_sN_t)$.

18. The element of claim 16, further comprising a noble metal in ionic charge communication with the mixed valence oxide compounds.

19. The element of claim 18, wherein the noble metal is selected from rhodium, ruthium, palladium, silver, osmium, platinum and gold.

20. The element of claim 18, wherein the noble metal is loaded onto the at least one n-type semiconductor.

21. The element of claim 16, wherein the mixed valence oxide compounds comprise pairs selected from copper(I) and copper(II); cobalt(II) and cobalt(III); Mn(II) and Mn(III); Fe(II) and Fe(III) and Ir(III) and Ir(IV).

22. The element of claim 16, wherein the at least one p-type semiconductor is loaded onto the at least one n-type semiconductor.

23. The element of claim 16, wherein the mixed valence oxide compounds are substantially uniformly dispersed onto the at least one n-type semiconductor.

24. The element of claim 16, wherein the mixed valence oxide compounds have a particle size of 100 nm or less.

25. The element of claim 21, wherein the copper(I) and copper(II) compound is a $Cu_xO$ compound.

26. The element of claim 25, wherein the $Cu_xO$ compound is chemically valence controlled.

27. The element of claim 21, wherein the ratio of copper(I) and copper(II) is between 10:90 to 90:10.

28. The element of claim 16, wherein the p-type semiconductor is 0.001 to 10 wt % of the element and the p-type semiconductor is 90 to 99.999 wt % of the element.

29. The element of claim 17, further comprising a noble metal in ionic charge communication with the mixed valence oxide compounds.

30. The element of claim 29, wherein the noble metal is selected from rhodium, ruthium, palladium, silver, osmium, platinum and gold.

31. The element of claim 29, wherein the noble metal is loaded onto the at least one n-type semiconductor.

32. The element of claim 17, wherein the mixed valence oxide compounds comprise pairs selected from copper(I) and copper(II); cobalt(II) and cobalt(III); Mn(II) and Mn(III); Fe(II) and Fe(III) and Ir(III) and Ir(IV).

33. The element of claim 17, wherein the at least one p-type semiconductor is loaded onto the at least one n-type semiconductor.

34. The element of claim 17, wherein the mixed valence oxide compounds are substantially uniformly dispersed onto the at least one n-type semiconductor.

35. The element of claim 17, wherein the mixed valence oxide compounds have a particle size of 100 nm or less.

36. The element of claim 32, wherein the copper(I) and copper(II) compound is a $Cu_xO$ compound.

37. The element of claim 36, wherein the $Cu_xO$ compound is chemically valence controlled.

38. The element of claim 32, wherein the ratio of copper(I) and copper(II) is between 10:90 to 90:10.

39. The element of claim 17, wherein the p-type semiconductor is 0.001 to 10 wt % of the element and the p-type semiconductor is 90 to 99.999 wt % of the element.

* * * * *